(12) United States Patent (10) Patent No.: US 9,131,078 B2
Li (45) Date of Patent: *Sep. 8, 2015

(54) APPARATUSES, METHODS, AND SYSTEMS FOR A PORTABLE, IMAGE-PROCESSING TRANSMITTER

(75) Inventor: Richard Tzar Kai Li, Hong Kong (HK)

(73) Assignee: Lagavulin Limited, Douglas (IM)

( * ) Notice: Subject to any disclaimer, the term of this patent is extended or adjusted under 35 U.S.C. 154(b) by 1150 days.

This patent is subject to a terminal disclaimer.

(21) Appl. No.: 12/172,138

(22) Filed: Jul. 11, 2008

(65) Prior Publication Data

US 2009/0070675 A1     Mar. 12, 2009

Related U.S. Application Data

(60) Provisional application No. 60/952,542, filed on Jul. 27, 2007, provisional application No. 60/952,543, filed on Jul. 27, 2007, provisional application No. 60/952,545, filed on Jul. 27, 2007.

(51) Int. Cl.
G06F 3/048          (2013.01)
H04N 1/00           (2006.01)
(Continued)

(52) U.S. Cl.
CPC ........... *H04N 1/00127* (2013.01); *G06Q 20/12* (2013.01); *G06Q 20/123* (2013.01);
(Continued)

(58) Field of Classification Search
USPC ......................................................... 715/716
See application file for complete search history.

(56) References Cited

U.S. PATENT DOCUMENTS 5,666,159 A    9/1997  Parulski et al.
5,671,279 A    9/1997  Elgamal
(Continued)

FOREIGN PATENT DOCUMENTS

EP       1650959 A3   5/2006
EP       2278781 A2   1/2011
(Continued)

OTHER PUBLICATIONS iPhone Users Guide, pp. 1-124, Jan. 9, 2013.*
(Continued)

*Primary Examiner* — William Bashore
*Assistant Examiner* — Henry Orr
(74) *Attorney, Agent, or Firm* — Chadbourne & Parke LLP

(57) ABSTRACT

This disclosure details the implementation of apparatuses, methods, and systems for a portable, image-processing transmitter. The transmitter provides a platform capable of managing, manipulating, storing, and transmitting digital media files across a wide array of transmission means and protocols. In one embodiment, the transmitter may be employed by photographers, photojournalists, and/or the like to rapidly process, edit, and send photographs or video to multiple news agencies, newspapers, magazines, television studios, websites, and/or the like while maintaining control over their photographs by allowing them to send reduced quality and watermarked proofs. The transmitter may be configured to allow users to first generate and transmit low-resolution preview images, thereby saving on transmission time and resources, and only send full resolution versions once approvals of the preview versions are received. The transmitter's broad communication capabilities ensure that it is maximally effective in locating and exploiting available communication networks, even from remote locations.

76 Claims, 20 Drawing Sheets

(51) Int. Cl.
*G06Q 20/12* (2012.01)
*G06Q 30/06* (2012.01)

(52) U.S. Cl.
CPC ............ *G06Q20/1235* (2013.01); *G06Q 30/06* (2013.01); *H04N 1/00307* (2013.01); *H04N 2201/0027* (2013.01); *H04N 2201/0044* (2013.01); *H04N 2201/0049* (2013.01); *H04N 2201/0055* (2013.01); *H04N 2201/0062* (2013.01); *H04N 2201/0084* (2013.01); *H04N 2201/0086* (2013.01); *H04N 2201/0087* (2013.01); *H04N 2201/0089* (2013.01); *H04N 2201/33378* (2013.01)

(56) References Cited

U.S. PATENT DOCUMENTS

| | | | |
|---|---|---|---|
| 5,734,915 | A | 3/1998 | Roewer |
| 5,841,390 | A | 11/1998 | Tsui |
| 5,845,283 | A | 12/1998 | Williams et al. |
| 5,926,479 | A | 7/1999 | Baran |
| 5,983,203 | A | 11/1999 | Church et al. |
| 6,034,619 | A | 3/2000 | Osborne et al. |
| 6,327,265 | B1 | 12/2001 | Hoffman et al. |
| 6,417,913 | B2 | 7/2002 | Tanaka |
| 6,547,456 | B2 | 4/2003 | Wechsler et al. |
| 6,602,001 | B1 | 8/2003 | Hatano et al. |
| 6,670,982 | B2 | 12/2003 | Clough et al. |
| 6,707,859 | B1 | 3/2004 | Kinnunen et al. |
| 6,745,024 | B1 | 6/2004 | DeJaco et al. |
| 6,750,902 | B1 | 6/2004 | Steinberg et al. |
| 6,812,962 | B1 | 11/2004 | Fredlund et al. |
| 6,821,034 | B2 | 11/2004 | Ohmura |
| 6,832,102 | B2 | 12/2004 | I'Anson |
| 6,930,709 | B1 | 8/2005 | Creamer |
| 6,945,461 | B1 | 9/2005 | Hien et al. |
| 6,963,358 | B2 | 11/2005 | Cohen et al. |
| 7,034,880 | B1 | 4/2006 | Endsley et al. |
| 7,057,648 | B2 | 6/2006 | Parulski et al. |
| 7,103,230 | B1* | 9/2006 | Jam et al. ............... 382/276 |
| 7,151,911 | B2 | 12/2006 | Matsumoto |
| 7,333,804 | B2* | 2/2008 | Kim ....................... 455/414.4 |
| 7,355,509 | B2* | 4/2008 | Rennie et al. ......... 340/426.16 |
| 7,365,871 | B2* | 4/2008 | Monroe .................... 358/1.15 |
| 7,421,192 | B2 | 9/2008 | Takahashi et al. |
| 7,489,945 | B2 | 2/2009 | Iida |
| 7,561,201 | B2 | 7/2009 | Hong |
| 7,586,524 | B2 | 9/2009 | Tsue et al. |
| 7,643,851 | B2 | 1/2010 | Otsuka et al. |
| 7,653,296 | B2 | 1/2010 | Wakamizu et al. |
| 7,734,915 | B2 | 6/2010 | Neill et al. |
| 7,764,308 | B2 | 7/2010 | Kusaka et al. |
| 7,986,344 | B1 | 7/2011 | Ishii |
| 7,999,854 | B2 | 8/2011 | Kazami et al. |
| 8,085,680 | B1* | 12/2011 | Craine ..................... 370/252 |
| 8,115,862 | B2 | 2/2012 | Umeyama et al. |
| 8,121,078 | B2 | 2/2012 | Siann et al. |
| 8,214,568 | B2 | 7/2012 | King |
| 2001/0048534 | A1 | 12/2001 | Tanaka et al. |
| 2002/0054233 | A1 | 5/2002 | Juen |
| 2003/0210331 | A1* | 11/2003 | Battles et al. ............ 348/211.2 |
| 2004/0041923 | A1 | 3/2004 | Iida |
| 2004/0201709 | A1 | 10/2004 | McIntyre et al. |
| 2005/0002057 | A1 | 1/2005 | Oe |
| 2005/0030375 | A1 | 2/2005 | Zangrande et al. |
| 2005/0036034 | A1 | 2/2005 | Rea et al. |
| 2005/0041459 | A1 | 2/2005 | McDonald |
| 2005/0129385 | A1 | 6/2005 | Speasl et al. |
| 2005/0144653 | A1 | 6/2005 | Creamer et al. |
| 2005/0275890 | A1* | 12/2005 | Nagasaka ................... 358/1.15 |
| 2006/0015664 | A1 | 1/2006 | Zhang |
| 2006/0087564 | A1 | 4/2006 | Kawamura |
| 2006/0161476 | A1 | 7/2006 | Zohar |
| 2006/0206795 | A1* | 9/2006 | Hess et al. ................... 715/500 |
| 2007/0192705 | A1* | 8/2007 | Lee ............................. 715/739 |
| 2008/0113683 | A1* | 5/2008 | Paas et al. ................. 455/552.1 |
| 2008/0305829 | A1* | 12/2008 | Monroe ..................... 455/556.1 |
| 2009/0016617 | A1 | 1/2009 | Bregman-Amitai et al. |
| 2009/0033749 | A1 | 2/2009 | Motoki et al. |
| 2009/0048860 | A1* | 2/2009 | Brotman et al. .................. 705/1 |
| 2009/0070675 | A1 | 3/2009 | Li |
| 2009/0128634 | A1 | 5/2009 | Miura et al. |
| 2009/0213242 | A1 | 8/2009 | Rofougaran et al. |
| 2010/0046748 | A1 | 2/2010 | Kusnoto et al. |
| 2010/0094932 | A1* | 4/2010 | Nagasaki ..................... 709/203 |
| 2010/0194880 | A1 | 8/2010 | Furutani et al. |
| 2011/0128389 | A1 | 6/2011 | Maeda et al. |
| 2011/0304760 | A1 | 12/2011 | Lee et al. |
| 2012/0229617 | A1 | 9/2012 | Yates et al. |
| 2012/0229654 | A1 | 9/2012 | Solomon |
| 2012/0242844 | A1 | 9/2012 | Walker et al. |

FOREIGN PATENT DOCUMENTS

| | | |
|---|---|---|
| EP | 2490138 A1 | 8/2012 |
| WO | WO01/58138 A | 8/2001 |
| WO | WO 02/086735 | 10/2002 |
| WO | WO2008/033094 | 3/2008 |
| WO | 2010078173 A1 | 7/2010 |

OTHER PUBLICATIONS

"Blackberry Pearl," http://www.blackberrypearl.com/h-function.jsp. Published Mar. 14, 2007; Printed Aug. 17, 2010.

Corcoran, et al., "Wireless Transfer of Images from a Digital Camera to the Internet via a Standard GSM Mobile Phone,"http://ieeexplore.ieee.org/ie15/7442/20226/00935307.pdf (Access Required). Published Aug. 2001; Printed Mar. 30, 2007.

"Introducing iPhone," http://www.apple.com/iphone. Published Mar. 6, 2007; Printed Aug. 17, 2010.

J., Martin, "Samsung SGH-F700," http://www.dodevice.com/2007/03/samsung-sgh-f700/. Printed Mar. 30, 2007.

Keller, Jeff, "DCRP Preview: Kodak EasyShare One,"http://www.dcresource.com/reviews/kodak/easyshare_one-review/. Printed Mar. 30, 2007.

Kellett, Brad, "Review: Samsung SGH—F700 (MobileBurn)," http://www.mobileburn.com/review.jsp?Id=3112. Printed Mar. 30, 2007.

Photo-John, "Wireless Digital Camera Guide," http://www.photographyreview.com/wirelesscameracrx.aspx. Printed Mar. 30, 2007.

"Windows Mobile Certified Software Catalog," http://www.microsoft.com/windowsmobile/catalog/search.aspx?catid=5&subid=22&bin=1&device=0&size=10&scope=0&qu=photo. Printed Mar. 30, 2007.

International Search Report.

Amadou Diallo, "Canon EOS 650D/Rebel T4i In-Depth Review," Digital Photography Review, http://www.dpreview.com/reviews/canon-eos-65od-rebel-t4i, Aug. 2012 (printed on Feb. 22, 2013).

* cited by examiner

APPARATUSES, METHODS, AND SYSTEMS FOR A PORTABLE, IMAGE-PROCESSING TRANSMITTER

PRIORITY CLAIMS AND RELATED APPLICATIONS

Applicants hereby claim priority under 35 USC §119 for U.S. provisional patent application Ser. No. 60/952,542 filed Jul. 27, 2007, entitled "USER INTERFACE FOR A PORTABLE, IMAGE-PROCESSING TRANSMITTER," U.S. provisional patent application Ser. No. 60/952,543 filed Jul. 27, 2007, entitled "APPARATUSES, METHODS, AND SYSTEMS FOR A PORTABLE, IMAGE-PROCESSING TRANSMITTER," and U.S. provisional patent application Ser. No. 60/952,545 filed Jul. 27, 2007, entitled "APPARATUSES, METHODS, AND SYSTEMS FOR A PORTABLE, AUTOMATED CONTRACTUAL IMAGE DEALER AND TRANSMITTER,".

The entire contents of the aforementioned applications are herein expressly incorporated by reference.

FIELD

The present invention is directed generally to apparatuses, methods, and systems of image processing, and more particularly, to apparatuses, methods and systems for a portable, image-processing transmitter.

BACKGROUND

Digital photography is an increasingly ubiquitous technology. Digital cameras have gained in popularity over film cameras and are, today, the standard across a broad array of applications spanning the spectrum from personal to professional usage. This is due in large part to the cost savings and relative ease with which digital images can be developed, modified, and transferred as compared to traditional film photographs. Images created and/or captured by today's digital cameras are often recorded in a removable storage medium, such as a flash memory card, and can be transferred to a computer via a dedicated cable. The commoditization of digital cameras has even resulted in their being added to cellular telephones, albeit in more limited capacities and resolutions.

SUMMARY

This disclosure details the implementation of apparatuses and methods for a portable, image-processing transmitter (hereafter, "Transmitter"). There is a growing need for quick and convenient manipulation and/or distribution of digital media files, including images, video, and audio content. The proliferation and rapid advancement of mobile digital media acquisition technologies have rendered that need particularly acute for applications in remote locations or that require handling of large and/or high resolution files without significantly compromising quality. The Transmitter fulfills these needs by providing a platform capable of managing, manipulating, storing, and transmitting digital images of various formats across a wide array of transmission means and protocols. Embodiments of the Transmitter may be employed by photographers, photojournalists, and/or the like to rapidly process, edit, and send high-quality photographs or video to multiple news agencies, newspapers, magazines, television studios, websites, and/or the like while maintaining control over their photographs by allowing them to send reduced quality and watermarked proofs. The Transmitter may be configured to allow users seeking to transmit large, high-resolution images to first generate and transmit low-resolution preview images, thereby saving on transmission time and resources. Full resolution versions of the images may then be transmitted as approvals of the preview versions are received.

In one embodiment, the Transmitter may be specifically configured to process and transmit high quality photos such as those taken by a single-lens reflex camera in the region of 10 mega pixels and beyond with resolution equal or better than 35 mm films. In contrast, cameras integrated into cellular telephones, personal digital assistants (PDAs), and/or the like frequently have significantly lower resolution and may lack other photographic elements such as advanced lenses, lighting, focus capabilities, sight sensor/electronics, and/or the like that may affect photo quality. Consequently, the Transmitter provides a significant advantage over these devices for an extensive array of applications. Furthermore, the Transmitter's broad communication capabilities ensure that it is maximally effective in locating and exploiting any of a wide variety of available communication networks, even when a photographer is in a remote location.

In various embodiments, some Transmitter features and/or configurations may incorporate:

interfaces or slots for reading from and writing to a variety of memory cards (e.g., CompactFlash, SD, Mini SD, xD, Memory Stick, and/or the like);

USB interfaces for reading and sending data and digital images;

one or more display screens for displaying images, video, and data;

touch-capabilities and/or a physical keyboard supporting alpha-numeric inputs;

personal e-mail address books, phone books, and/or the like;

image and/or video editing capabilities, such as resolution, color saturation, special effects, cropping, red-eye reduction, and/or the like;

keypads with functional and/or hot functional buttons, such as for sending, receiving, displaying, deleting, and editing images and/or video;

multiple forms of transmission capabilities, including mobile networks (e.g., GSM, GPRS, W-CDMA, CDMA, CDMA2000, HSPDA, and/or the like), wireless transmission (e.g., WiFi, Bluetooth, and/or the like), Ethernet, USB, and/or the like for sending and/or receiving data, digital images, video, and/or the like;

software providing a user-friendly interface for sending and/or receiving, viewing, editing, saving, deleting, and/or the like data, digital images, video, and/or the like; and memory for storing data and unedited/edited digital images.

In one embodiment, a method is disclosed for processing digital media, comprising: receiving a digital media file from a digital media input interface array, the digital media input interface array including at least a memory card slot; providing the digital media file for display on a display screen; receiving at least one digital media file editing instruction; modifying the digital media file based on the at least one digital media file editing instruction; receiving at least one destination designation; selecting at least one digital media transmission format, including any of a cellular network format, a wireless transmission format, an Ethernet format, or a USB format; configuring the digital media file in accordance with the at least one data transmission format; and sending the digital media file to a destination specified by the at least one destination designation via a digital media output interface array, the digital media output interface array including output components providing transmission capabilities consistent with at least the cellular network format, the wireless transmission format, the Ethernet format, and the USB format.

BRIEF DESCRIPTION OF THE DRAWINGS

The accompanying appendices and/or drawings illustrate various non-limiting, example, inventive aspects in accordance with the present disclosure.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

In order to address various issues such as those discussed above, the invention is directed to systems, methods and apparatuses for a portable, image-processing transmitter (hereafter "Transmitter"). It is to be understood that, depending on the particular needs and/or characteristics of a Transmitter user, manufacturer, component set, data transmission method, and/or the like, various embodiments of the Transmitter may be implemented that enable a great deal of flexibility and customization. The instant disclosure discusses an embodiment of the Transmitter primarily within the context of editing and transmitting digital media files, in particular still images. However, it is to be understood that the system described herein may be readily configured/customized for a wide range of other applications or implementations. For example, aspects of the Transmitter may be adapted for processing other types of digital media files such as video, audio, text, graphics, and/or the like; for previewing and/or broadcasting media; for imposing security and/or authentication elements onto media files; and/or the like. It is to be understood that the Transmitter may be further adapted to other implementations or media editing and/or transmitting applications.

The following figures and associated discussion illustrate, by way of example only, particular embodiments and implementations of Transmitter operation.

Transmitter Device

Figure 1:
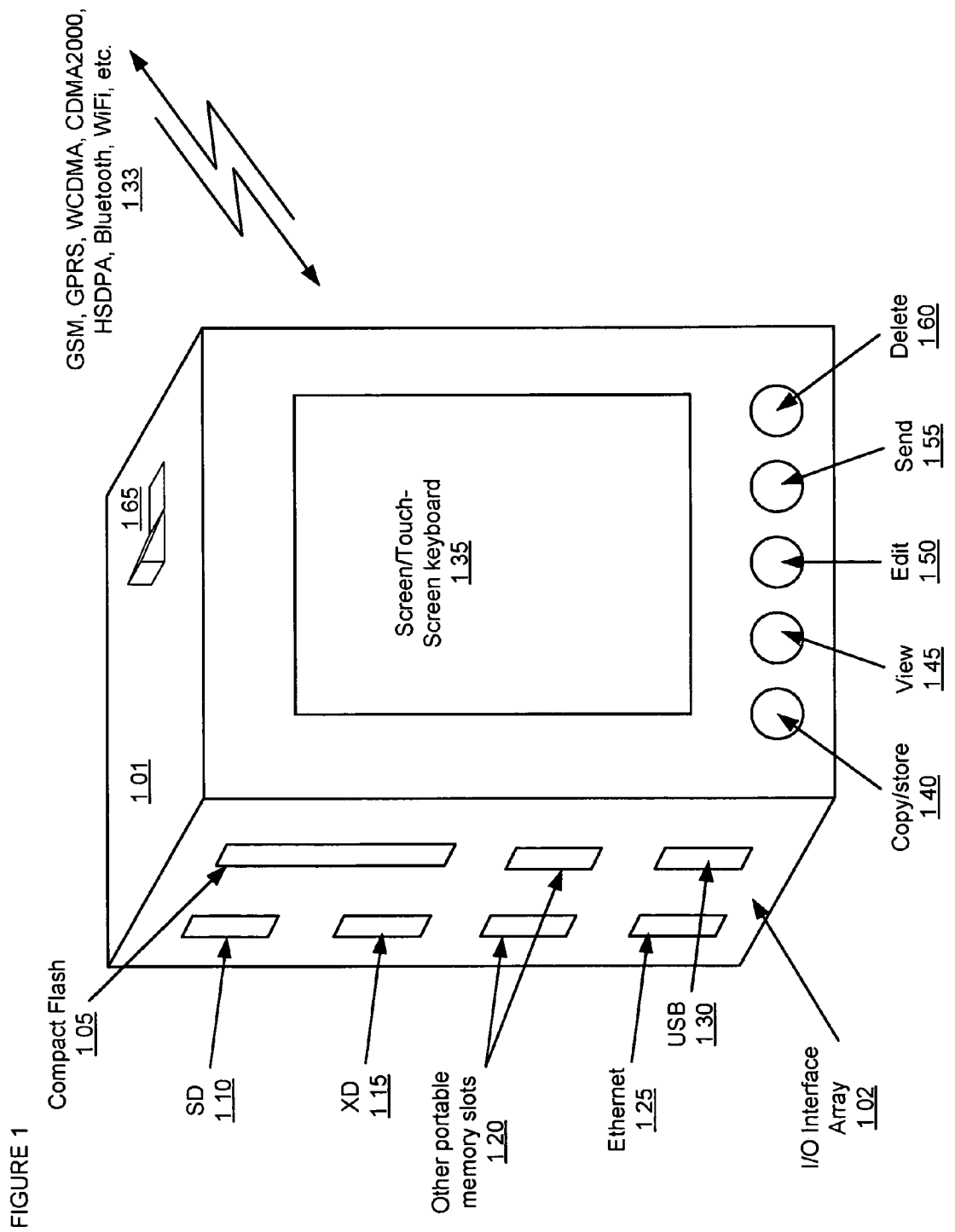
FIG. 1 shows a schematic illustration of a device implementing Transmitter functionality in one embodiment.

FIG. 1 shows a schematic illustration of a device implementing Transmitter functionality in one embodiment. The device 101 includes an input and/or output (I/O) interface array 102 housing ports and slots to admit conduits for a wide variety of transmission means, protocols, and devices, such as CompactFlash memory cards 105, Secure Digital (SD) Flash memory cards 110, extreme digital (XD) picture cards 115, and other similar forms of portable memory storage 120 (e.g., mini SD, memory stick, etc.), as well as ports for Ethernet 125 and/or USB 130 cable connections.

In addition, the Transmitter device may contain one or more transceivers, antennas, amplifiers, and/or the like for facilitating the reception and/or transmission of data over a variety of different data communication networks, formats, and protocols, including but not limited to Global System for Mobile Communication (GSM), General Packet Radio Service (GPRS), Wideband Code Division Multiple Access (W-CDMA), CDMA, CDMA2000, High-Speed Downlink Packet Access (HSDPA), wireless personal area networks (e.g., Bluetooth), wireless local area networks (e.g., WiFi), and/or the like. In various embodiments, components facilitating the use of any or all of these communication mechanisms and protocols may be incorporated into a single Transmitter device.

The Transmitter device may also be equipped with a display screen 135 that may be employed to display images and various other aspects of Transmitter functionality (e.g., editing tools, address book, file statuses, etc.) and, in some embodiments, may be configured to admit touch-screen inputs via a finger, stylus, and/or the like. An appropriate Liquid Crystal Display, Organic Light-Emitting Diode, and/or the like flat-screen based technology may be used. In an embodiment wherein the display screen admits touch-screen inputs, a keypad and/or functional/hot buttons may be incorporated into a user interface display to facilitate manipulation and/or transmission of digital media files and/or other Transmitter functionality. The user interface in such an embodiment will be discussed in greater detail below. In lieu of or in addition to touch-screen buttons, the Transmitter device may also incorporate additional user interface buttons, dials, switches, trackballs, joysticks, keypads, and/or the like in order to receive user inputs. Some examples of possible input buttons are displayed in FIG. 1, such as buttons to admit commands for copying and/or storing 140, viewing 145, editing 150, sending 155, and deleting 160 digital media files. The figure also shows a power switch 165 that may be operated for turning the device on or off. The Transmitter may be configured with components to receive power by a variety of different means including ordinary or rechargeable batteries, line power and/or mains electricity, solar panels, powered USB, and/or the like.

Transmitter Data Flow

Figure 2:
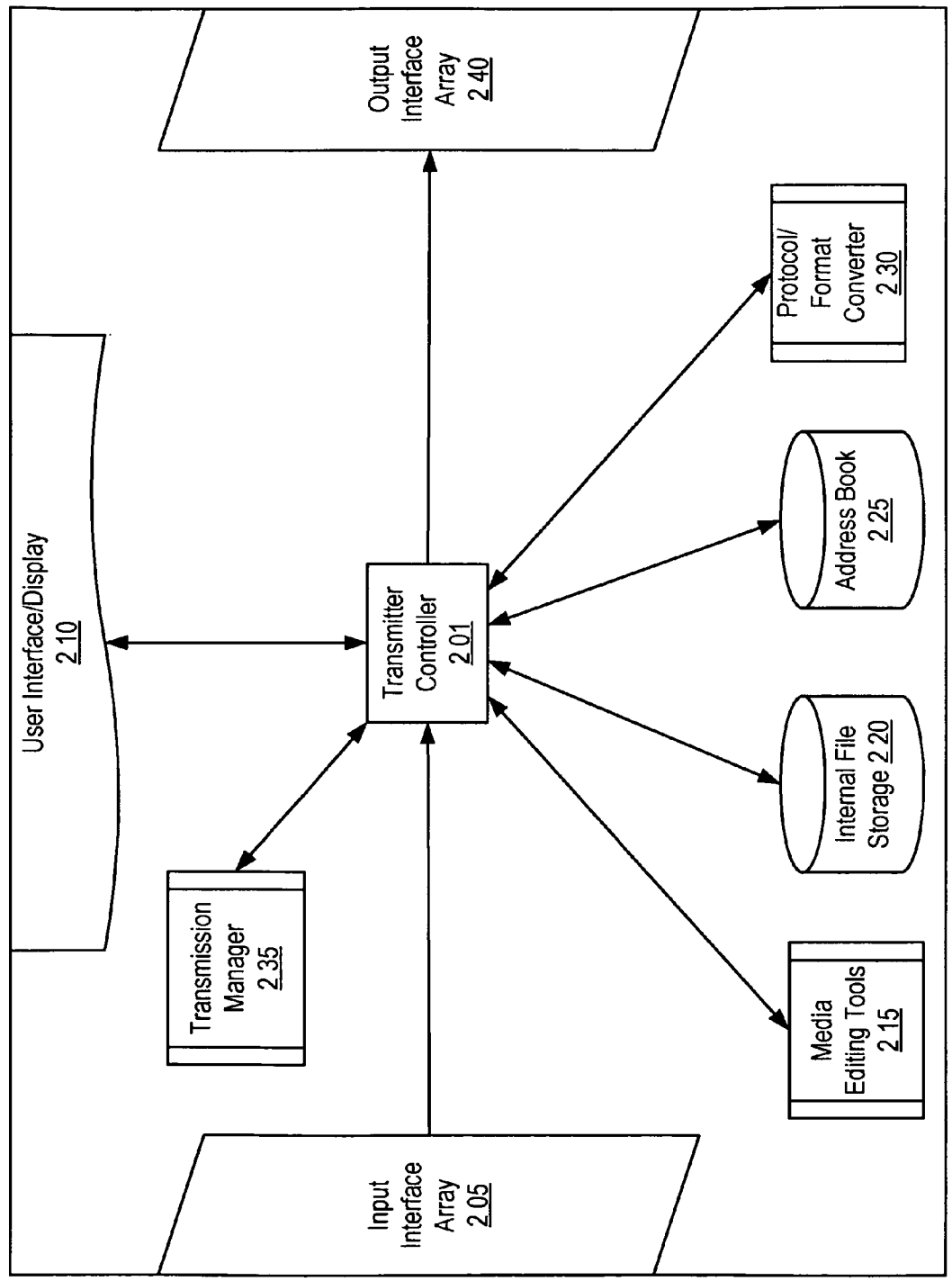
FIG. 2 shows an overview of an implementation of data flow within one embodiment of Transmitter operation.

FIG. 2 shows an overview of an implementation of data flow within one embodiment of Transmitter operation. A Transmitter Controller 201 may, in one embodiment, serve a central role in acquisition, organization, manipulation, and transmission of digital media, user commands, and/or the like. The Controller 201 is coupled to an Input Interface Array 205 to receive digital media files therefrom. The Input Interface Array 205 may admit a variety of different input formats, protocols, and/or the like, including but not limited to memory cards (e.g., flash memory), wireless and/or cellular data signals, Ethernet cables, USB cables, serial cables, camera cables, diskettes, CDs, DVDs, and/or the like. In alternative implementations, the Input Interface Array 205 may further incorporate an integrated camera, microphone, and/or the like for direct acquisition and/or production of media files.

Media files received in the Transmitter Controller 201 may be relayed to and/or manipulated by a number of Transmitter modules to which the Controller is coupled. These modules may include a User Interface/Display 210, which may be employed to provide digital media files for display or user inspection, as well as to receive user instructions for and/or interactions with the digital media files. The User Interface/Display 210 may, in one implementation, comprise a touch-screen interface. In various implementations, the User Interface/Display 210 may include buttons, dials, switches, trackballs, joysticks, keypads, and/or the like to admit and receive user inputs. In another implementation, the User Interface/Display may further include a speaker capable of audio playback.

The Transmitter may also include a number of Media Editing Tools 215, coupled to the Transmitter Controller 201, that are selectable and/or controllable via the User Interface/Display 210, and with which a user may manipulate digital media files. In an embodiment admitting still image digital media files, the Media Editing Tools may include but are not limited to cropping, selecting, copying, pasting, resizing, rotating, zooming in and out, red-eye reduction, brightness adjustment, sharpness adjustment, contrast adjustment, color saturation adjustment, color balance adjustment, hue adjustment, gamma correction, resolution adjustment, special effects (e.g., airbrushing, filters, lens effects, applying titles or text, applying borders, and/or the like), watermark application, file format manipulation, file compression/decompression, and/or the like. In an embodiment admitting video image digital media files, the Media Editing Tools may include but are not limited to all of the aforementioned, as well as tools facilitating frame rates and/or speed adjustments, sequence editing and/or manipulation, and/or the like. In an embodiment admitting audio digital media files, either stand-alone or in conjunction with video, the Media Editing Tools may include but are not limited to tools facilitating volume adjustment, playback rate, pitch adjustment, audio effects (e.g., echo, filtering, etc.), and/or the like. In one embodiment, such image processing modules may be supplied by various codecs and/or image processing plug-ins from various free software sources; e.g., the GNU Image Manipulation Program (GIMP) suite.

The Transmitter Controller 201 may further be coupled to an Internal File Storage component 220, wherein digital media files may be stored for future use. The Internal File Storage component 220 may, in various implementations, comprise an internal hard drive, magnetic storage medium, optical storage medium, flash memory, and/or the like. In an alternative implementation, the Internal File Storage component 220 may comprise a removable storage medium, such as a dedicated Transmitter flash memory card. In yet another implementation, the Transmitter may altogether lack any Internal File Storage component.

The Transmitter Controller 201 may further be coupled to a digital Address Book 225, wherein contact information and/or other transmission destination designations may be stored for future reference and use. Address Book 225 contents may comprise e-mail addresses, IP addresses, telephone numbers, URLs, and/or the like as well as any other destination, individual, or organizational identifying or characterizing information. In one implementation, the Address Book 225 may admit group designations, wherein a number of individual Address Book 225 entries are collected under a single group entry such that designation of the group as a recipient of a particular digital media file package results in the package being sent to destinations corresponding to all individuals within the group.

The Transmitter Controller 201 may further be coupled to a Protocol/Format Converter 230, which may store and/or implement information and/or instructions to facilitate the formatting, conversion, compression, modification, encoding, and/or the like of digital media files into numerous output file formats (e.g., JPEG, RAW, TIFF, etc.). In turn, such files can be transmitted via the Transmitter's transport components along various network connections, data links, and/or physical layer communication protocols or formats for which the Transmitter is configured within a particular implementation or embodiment. Communication protocols and/or formats for which the Transmitter may be configurable include, but are not limited to, GSM, GPRS, W-CDMA, CDMA, CDMA2000, HSDPA, Ethernet, WiFi, Bluetooth, USB, and/or the like. Numerous data transfer protocols may be employed upon such connections, for example, TCP/IP and/or higher protocols such as HTTP post, FTP put commands, and/or the like.

The Transmitter Controller 201 may further be coupled to a Transmission Manager 235, which may monitor, track, and/or process incoming requests for digital media and manage address book entries and outgoing transmissions. In one implementation, the Transmission Manager 235 may enable a user to generate address lists, group mailings, and/or the like and/or to generate macros whereby a user may automatically process a set of selected images in a pre-specified manner and send them to a designated group of recipients. For example, a user may set a preview macro via the Transmission Manager 235 such that a set of low-resolution preview images are generated and sent to a pre-selected list of recipients for any selected images to which the preview macro is applied. In another implementation, the Transmission Manager 235 may be configured to monitor and/or respond to incoming messages received by the Transmitter. For example, the Transmission Manager 235 may be configured to check incoming e-mails for specific content (e.g., expected text within the subject header, within the e-mail body, etc.) indicating a request for one or more images and, consequently, either automatically transmit the requested images to the requester or prompt the Transmitter user that the request has been received and offer a one-click option to transmit the images to the requester. In the event of multiple requests, the Transmission Manager 235 may be configured to discern additional information from request messages to determine which request to fulfill, such as which request was received first, which request includes the largest payment, which request was made by a preferred recipient, and/or the like.

Once processed, digital media files may be transmitted, for example to destinations selected from the Address Book 225, via an Output Interface Array 240. The Output Interface Array 240 may include components facilitating transmission of digital media files via a variety of different communication protocols and/or formats as coordinated with the Protocol/

Format Converter module 230. The Output Interface Array 240 may, for example, contain ports, slots, antennas, amplifiers, and/or the like to facilitate transmission of files via any of the aforementioned methods. In one implementation, some components may be shared between the Output Interface Array 240 and the Input Interface Array 205 (e.g., a single USB port).

In another implementation, the Transmitter may further include a timer and/or calendar module, facilitating scheduled receipt and/or transmission of digital media files. In one embodiment, a unix cron job, and/or the like, may be employed for such scheduled and/or periodic operation. For example, a calendar module permits a Transmitter user to send the entire contents of a directory in the Internal File Storage database 220 to a designated destination at the same time every week. In another implementation, the Transmitter may further include e-mail clients, web clients, ftp clients, telnet clients, and/or the like.

In alternative Transmitter embodiments or implementations, any or all of the aforementioned modules may be contained within the Transmitter Controller rather than separately coupled to it. For example, digital media files may be stored in a Media Files table, editing tools in a Tools table, Address Book entries in an Address Book table, and communication protocols in a Protocols table, all within the Transmitter Controller 201. These tables and further aspects of the Transmitter will be discussed in the exposition of the Transmitter Controller provided below.

Transmitter Logic Flow

Figure 3:
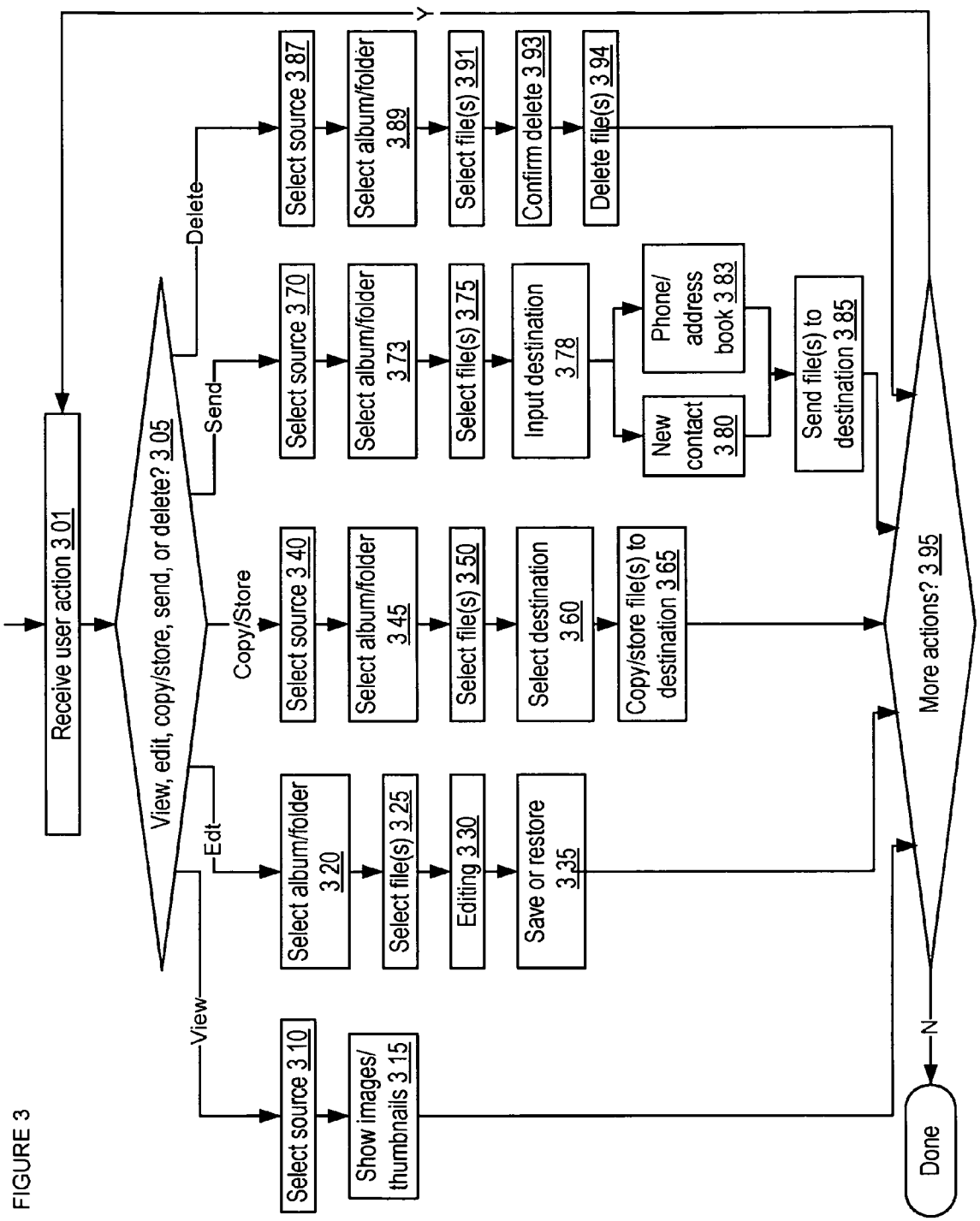
FIG. 3 shows an implementation of overall logic flow in one embodiment of Transmitter operation.

FIG. 3 shows an implementation of overall logic flow in one embodiment of Transmitter operation. A user action is received at 301, and the Transmitter queries the nature of that action at 305, determining in this embodiment whether the user has elected to view, edit, copy/store, send, or delete media files. If the user selects the option to view files, a file source selection is received at 310, such as a memory card, internal storage, wireless or wired data link, and/or any other data source coupled to via the input interface array. Files in the selected source are provided for display, as whole images and/or thumbnails, at 315. In an alternative implementation, the user may be provided with a listing of albums and/or folders containing digital media files within the selected source to select from and/or may be permitted to select a subset of available files for display from those available.

If the user selects the option to edit files, an album and/or folder selection is received at 320, followed by a selection of a file or files 325 from within the selected album/folder for editing. Receipt and implementation of editing instructions proceeds at 330, and the user is provided with an option to save the changes to the edited files or to restore the file to its original form prior to editing at 335. In one embodiment, image processing editing may be achieved by employing open-source plug-in modules (e.g., GIMP plug-ins) whereby the entire image or marquee selections of the image are provided to the plug-ins for processing. In other embodiments, image processing editing may be achieved by employing components of 2D graphics libraries such as Cairo and/or the like. In further embodiments, image editing may be achieved by interfacing with APIs from commercial packages such as PocketBrush and/or the like that run on Microsoft Windows Mobile.

If the user selects the option to copy and/or store files, a file source selection is received at 340, followed by selections of album and/or folder 345 and file or files 350 for copying and/or storing. A destination selection is received at 360, which may include any internal or external file storage locations, such as internal or external hard drives or other magnetic storage media, internal or external flash memory, internal or external optical storage media, and/or the like. The selected file(s) are copied and/or stored to the selected destination(s) at 365.

If the user selects the option to send files, a file source selection is received at 370, followed by selections of album and/or folder 373 and file or files 375 for sending. A destination input is received at 378. The destination input may include one or more phone book or Address Book entries (e.g., SIM card entries) 383 and/or new e-mail addresses, IP addresses, URLs, telephone numbers, and/or the like 380. In one implementation, the Transmitter may offer the option to automatically incorporate a detected new destination designation into an existing Address Book. The destination input may further include a selection of one or more preferred communication protocols and/or formats to be used in sending the designated files. Protocol selections may be made by a user or may be automatically selected by the Transmitter. Further details surrounding protocol selection are provided in discussions below. The selected file(s) are sent to the input destination(s) at 385. In an alternative implementation, the user is requested to confirm the sending of files prior to the files being transmitted.

If the user selects the option to delete files, a file source selection is received at 387, followed by selections of album and/or folder 389 and file or files 391 for deleting. The user is requested to confirm the deleting of the file(s) at 393 and, if confirmed, the Transmitter deletes the selected file(s) at 394.

A determination is made at 395 as to whether there are additional user actions to consider. If so, the flow returns to 301. Otherwise, the flow exits.

Figure 4:
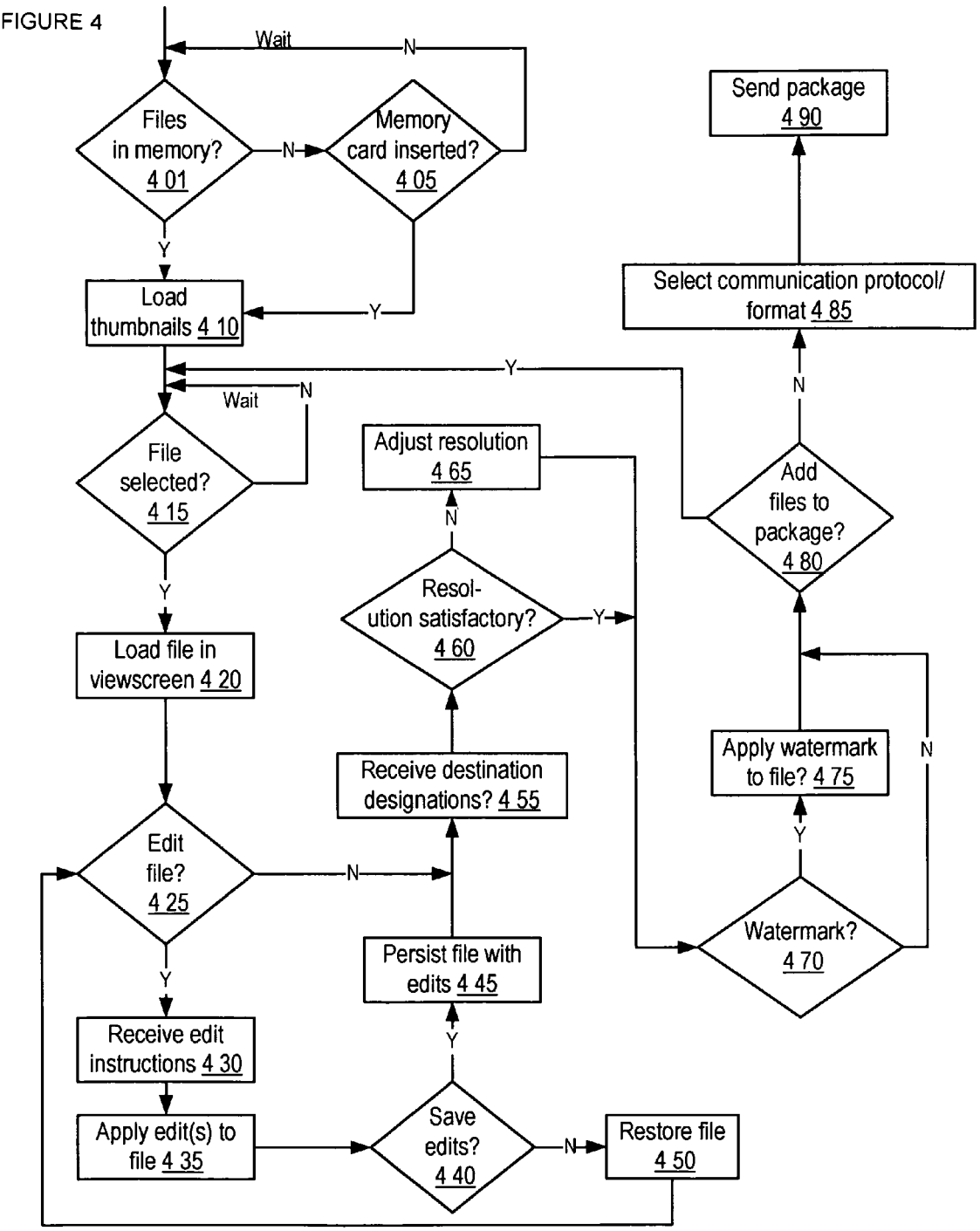
FIG. 4 shows an implementation of overall logic flow in another embodiment of Transmitter operation.

FIG. 4 shows an implementation of overall logic flow in another embodiment of Transmitter operation. The Transmitter determines at 401 whether there are digital media files available in memory. It may, for example, check internal and external storage components for all available digital media files and provide a list of available sources for the user to select from. In one implementation, the Transmitter may automatically select the file source if there is a default source designation or if there is only one file source containing valid digital media files. If the Transmitter finds no available files in memory, it may prompt the user to insert a memory card 405. If the user fails to do so, the Transmitter may wait for a period of time and subsequently return to 401 to check again for available files in memory. It may turn off, otherwise, to conserve energy. Once files are determined to be available, they are loaded for viewing on the display screen at 410. In one implementation, the files or a subset or reduced rendering thereof may be displayed as thumbnail images. The Transmitter determines at 415 whether the user has selected a media file from among the thumbnails and, if not, waits until such a selection is made. If a media file has been selected, it may be loaded for full-size display in the display screen at 420.

The Transmitter provides the user with the option to edit selected files at 425. If the user elects to edit a selected file, the Transmitter receives the user's file editing instructions at 430 and applies the corresponding edits to the file at 435. The Transmitter then provides the user with the option to save the applied edits 440 and, if the user accepts that option, the edited file is persisted at 445. In one implementation, the user is requested to specify a destination to which the file is to be saved. If the user declines the option to save the file, then the file is restored to its pre-restoration condition at 450.

At 455, the Transmitter receives one or more destination designations from the user to which selected files are to be sent. In an alternative implementation, the selection of one or more destination designations may be performed once after all files for a particular package have been selected.

At 460, the Transmitter provides a mechanism for the user to establish whether the resolution of the selected media file is satisfactory and, if not, the user is allowed to adjust the resolution at 465. The Transmitter also allows the user to establish whether a watermark should be applied to the selected media file 470. In one implementation, the watermark may be selected from a collection of saved user watermarks. In another implementation, an applied watermark may specify a user identity. For example, a watermark identifying a photographer may be applied to digital images shot by that photographer. In yet another embodiment, the user may be provided with the opportunity to create a new watermark within the media file editing functionality of Transmitter operation. Any selected or created watermarks are applied to the media file at 475. For example, the user could type in their name and copyright date as a watermark design, and large text would overlay the entirety of the photo at some level of transparency such that the photo is visible, yet not usable in a commercial application.

The Transmitter determines at 480 whether the user desires to incorporate additional media files into an out-bound package and, if so, the flow returns to 415. Once a package is complete and ready for transmission, a communication protocol and/or format is selected at 485. Files in the package are subsequently processed and/or converted into a form consistent with the selected protocol and transmitted to the designated destinations at 490. In another implementation, file packages may be admitted to temporary and/or permanent internal or external storage prior to being sent. A user may, for example, desire to incorporate additional media files into the package in the future prior to sharing the package.

Transmitter User Interface

Figure 5:
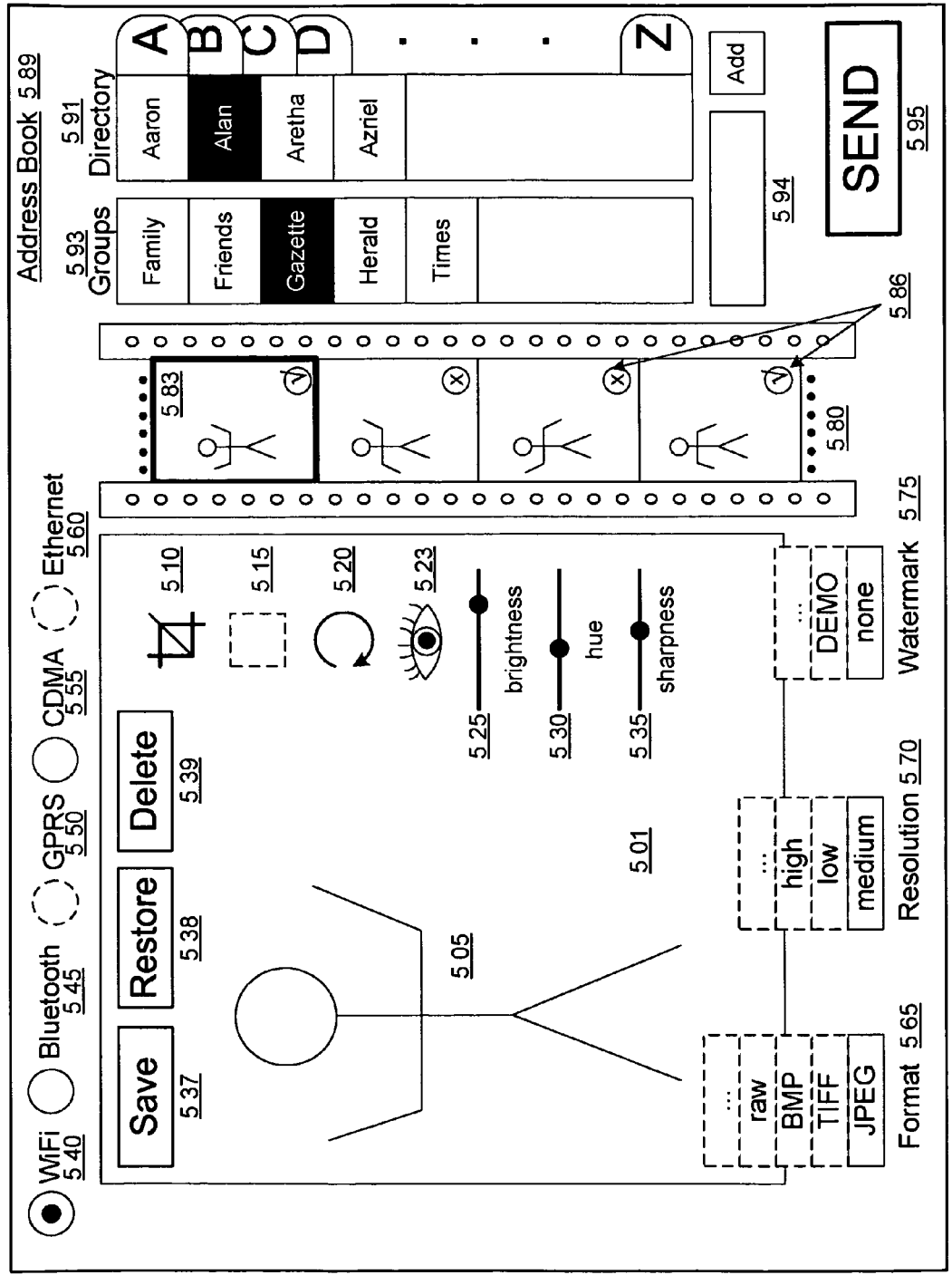
FIG. 5 illustrates an implementation of a user interface in one embodiment of Transmitter operation.

FIG. 5 illustrates an implementation of a user interface in one embodiment of Transmitter operation. The user interface in this embodiment is configured as a touch-screen display. Among the components of the interface are an image viewing area 501, wherein full-size images, videos, and/or the like 505 may be viewed. Within the viewing area are also a listing of icons representative of various image editing tools, including a crop tool 510, selection/resizing tool 515, rotation tool 520, redeye reduction tool 523, brightness adjustment tool 525, hue adjustment tool 530, and sharpness adjustment tool 535, and/or the like may be overlaid and/or provided via pop-up menu and/or the like. Other media file editing tools, such as those discussed previously, may have associated icons included in the display. In an alternative implementation, the display may employ a system of menus to facilitate organization and selection of media file editing tools. The viewing area 501 in FIG. 5 further includes buttons to save 537, restore 538, and/or delete 539 a media file in the displayed in the viewing area.

Proximate to the viewing area 501 are shown a collection of buttons associated with different communication protocols, including WiFi 540, Bluetooth 545, GPRS 550, CDMA 555, and Ethernet 560. Any other communication protocols, such as those mentioned previously, may also be included in the display. In one implementation, the listing of protocols may serve as an indication to the user of which protocols are available and/or in communicative contact with the Transmitter. For example, in FIG. 5, WiFi 540, Bluetooth 545, and CDMA 555 have solid circles, indicating an available communication means, while GPRS 550 and Ethernet 560 have broken circles, indicating unavailable communication means (e.g., the Transmitter is out of range for a GPRS network, no Ethernet cable is inserted, etc.). The filled circle (in this case that of WiFi 540) may indicate the communication protocol that is to be used for transmission of media files. In one implementation, the protocol to be used may be automatically selected by the Transmitter based on an analysis of protocol performance and/or integrity. In another embodiment, the cheapest protocol may be selected automatically. Such issues are discussed in greater detail below. In another implementation, the communication protocol buttons may admit touch-screen input, whereby a user may select and/or override Transmitter selection of a communication protocol.

The user interface further contains a selection of pop-up menus whereby a user may select a desired file format 565, resolution 570, and/or watermark 575 for the displayed file(s). In the example shown in FIG. 5, the file format option may admit selections such as but not limited to JPEG, TIFF, BMP, raw image/video/audio, GIF, TGA, PCX, AVI, WMV, RealVideo, RealAudio, MPEG1-4, ISO image, ZIP, RAR, and/or the like. The resolution option may admit selections such as high, medium, low, maximum, preview, and/or the like. In an alternative implementation, the resolution may, like the brightness 525, hue 530, and sharpness 535 adjustments, admit a continuous variation, as may be designated using a slider widget or similar interface component. The watermark option may admit selections corresponding to no watermark and/or any of a selection of watermarks created, uploaded, and/or watermarks stored by a user. In one embodiment, a "new" option is available to the user for the user to create new watermarks on demand. In other implementations, the user may elect to imprint the full-resolution images with watermarks that are steganographically encoded.

The facility provided by the Transmitter in adjusting image resolution and/or applying watermarks may prove particularly useful for applications in which large and/or high-resolution images need to be quickly transmitted and/or approved by potential recipients. For example, photojournalists may take a large number of photographs with a high-resolution, digital single-lens reflex camera and desire to send them for review to one or more news organizations. It may be unfeasible to send all of the full-resolution images for review, and the photojournalist may be concerned about unauthorized distribution of the images. Consequently, it may be advantageous to send the images in a low-resolution format, receive requests for a subset of approved images, and then send full-resolution versions of the requested images. Consequently, a Transmitter user may first generate a low-resolution preview version of an image or series of images for transmission to one or more recipients. The user may also elect to imprint the preview images with a watermark in order to further dissuade distribution of the preview images. The recipients, then, may inspect the preview images and determine which, if any, they desire full-resolution copies of. At that time, they may transmit a request message to the Transmitter and/or Transmitter user, who may subsequently transmit full-resolution copies to requesting recipients.

In one embodiment, the Transmitter may be configured to communicate with one or more network-based storage units (e.g., network-attached storage) for archiving media files. A transmitter user may elect to transmit one or more preview-quality and/or full-quality media files to the one or more network-based storage units for storage once the files have been satisfactorily processed. In one implementation, the Transmitter's user interface may include one or more elements that the user may manipulate to efficiently transmit a selection of media files to the one or more storage units. In another implementation, the Transmitter may accompany the media files with access information (e.g., a login and/or password) and/or device identification information in order to be granted access to the storage units. Subsequent to successful storage, a user may direct media-requesting entities to the one or more storage units for retrieval of requested media files. For example, a Transmitter user may transmit a collection of low-resolution images to a plurality of potential buyers and direct the buyer offering the highest price for a given image to the appropriate storage unit from which a high-resolution version of the selected image may be retrieved. The Transmitter user may further provide whatever additional information necessary for the buyer to gain access to the storage unit and/or media files contained therein. In this manner, the Transmitter user eliminates the need for multiple transmissions of full and/or preview quality images via the Transmitter's wireless communication channels, thereby saving time and expediting the transaction process.

The user interface further includes a collection of media file thumbnails, configured in this example as a mock filmstrip 580. In an alternative embodiment, the contents of a particular memory store may be also or alternatively displayed in a filename list, directory structure, and/or the like. A particular thumbnail 583 may be selected and/or highlighted 583 within the collection for display in the full-size viewing screen 501. Associated with each thumbnail in this example is also a selection button 586, indicating whether a particular image is selected or deselected for inclusion in a transmission package. In one implementation, the selection button 586 merely indicates the inclusion status of a particular image with respect to a transmission package while, in another implementation, the user may actually manipulate the selection button 586 to include or exclude an image with respect to a transmission package. In one embodiment, buttons may be provided to include/select or deselect all items in the filmstrip for added convenience.

The user interface further includes an Address Book interface 589, whereby a user may browse and/or select destination designations, including individual addresses in a directory 591 as well as group designations 593. A user may select one or more entries from the Address Book to which a media file package may be sent. The interface further includes a text box 594, wherein a user may type an address to which a package may be sent and/or for inclusion in the address book. Once the destination has been specified, the user may manipulate a Send button 595 to initiate the transmission of the media file package. Users may select individuals form the address directory 591 for inclusion in groups 593 by selecting the individual(s) in the directory 591 and engaging the "Add" button 594. In this manner, a user may select a single group and "send" 595 a package to all the group members with a minimum of effort.

In another implementation of the user interface, a virtual keyboard, keypad, and/or the like may be incorporated to facilitate the input of text. In another implementation, an actual keyboard, keypad, and/or the like may be incorporated into a Transmitter device.

Communication Protocol Selection

Figure 6:
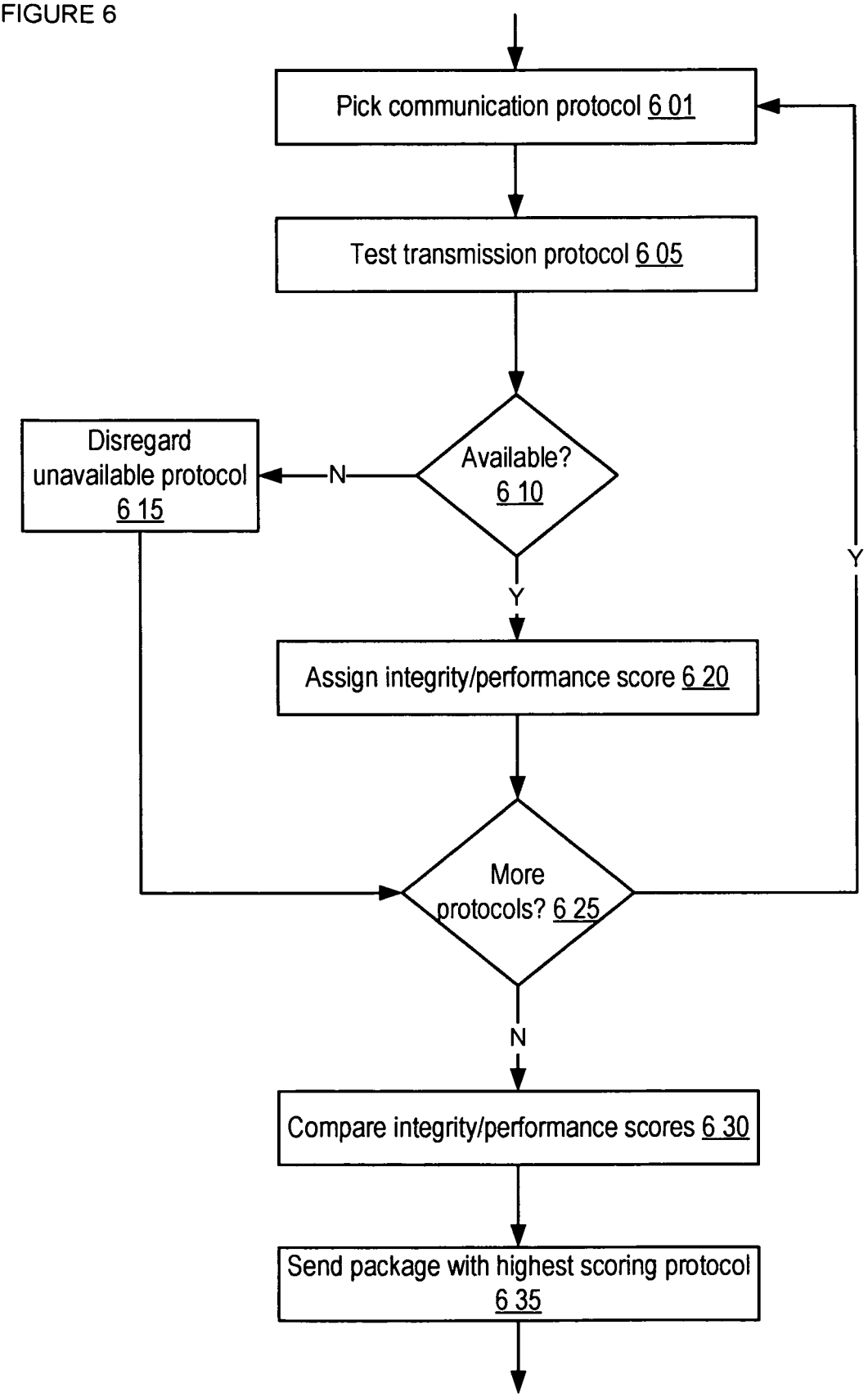
FIG. 6 shows an implementation of logic flow for automatic communication protocol selection in one embodiment of Transmitter operation.

FIG. 6 shows an implementation of logic flow for automatic communication protocol selection in one embodiment of Transmitter operation. A communication protocol is picked from the group of all untested protocols at 601 and this protocol is tested at 605. Testing a protocol may, for example, comprise sending and/or attempting to send one or more token units of information via a given protocol and monitoring transfer rates, reliability, monitoring the reported signal strength of the relevant base station, and/or the like. Based on the test, the Transmitter determines whether a given communication protocol is available as a transmission option (e.g., if an Ethernet cable is connected, if the Transmitter is within a particular cellular network, etc.) and, if not, then the particular protocol is disregarded. This may, in one implementation, be accompanied by a hashing, and/or the like, of a protocol button in the user interface (see, e.g., 550 in FIG. 5). If, on the other hand, the communication protocol is available, then a score may be assigned to the protocol 620 based on the expected integrity and/or performance of transmission using that protocol. The Transmitter checks at 625 whether there are more protocols to test and, if so, returns to 601. Otherwise, the scores are compared across available protocols at 630, and the highest scoring protocol is selected for use in sending the package 635.

In an alternative implementation, the user may be provided with the option to override the automatic communication protocol selection and select an alternative, available communication protocol for package transmission. In another implementation, the user may be provided with the sole discretion in selecting an available communication protocol for package transmission, and may be provided with information to assist in the decision, such as transfer rates, reported signal strength of the relevant base stations, and/or integrity scores.

During such testing, the Transmitter may determine current transfer rates, and costs for that protocol for a given time and location, and as such make recommendations to the user. For example, the Transmitter can be configured to highlight the cheapest method of communication, or the fastest method of communication. In one embodiment, the Transmitter can display the estimated time to transmit a selected package, and the estimated cost under each protocol option to better inform the user of his/her options. In still another implementation, the Transmitter may elect to distribute package data across more than one communication protocols as needed or desired to maximize transfer efficiency, reliability, speed, and/or the like.

Media Request Management

Figure 7:
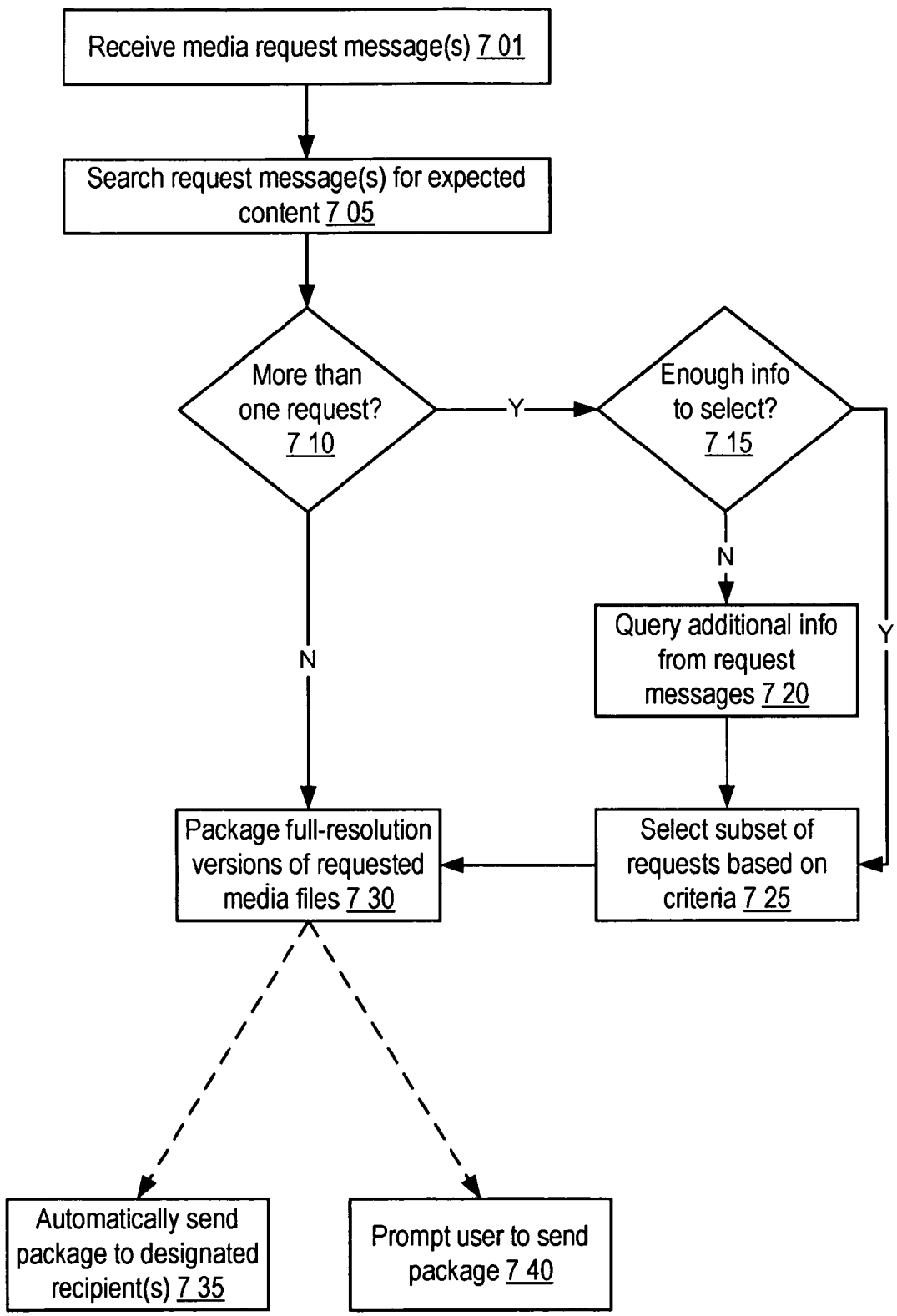
FIG. 7 shows an implementation of media request management in one embodiment of Transmitter operation.

In one embodiment, the Transmitter may be configured to detect and/or respond to the receipt of messages requesting media files. FIG. 7 shows an implementation of media request management in one embodiment of Transmitter operation. The Transmitter receives one or more messages requesting media files at 701, and the content of those messages is searched for expected content at 705. For example, the Transmitter may expect a properly formatted media request message to include the word "request" along with a media file ID number in the subject header. At 710, the Transmitter determines whether there are more than one request messages and, if not, proceeds to package the one or more requested media files at 730 in anticipation of sending to the requesting entity. If, however, there are request messages received from more than one entity, then the Transmitter determines whether enough information has been extracted from the request messages to select the appropriate requesting entities to which the media files should be sent 715. If additional information is needed to make the selection, that information is extracted from the request messages at 720. Once sufficient information has been extracted from the request messages, the Transmitter may select a subset of requesting entities to which the requested media files should be sent based on that information in light of a set of selection criteria 725.

The nature of the selection criteria and the associated information requirements may vary within different applications of the Transmitter. For example, a user may desire to send the requested digital media files to the first three requesting entities to submit request messages. Thus, the Transmitter would query the date and/or time associated with each request message and select those three messages having the earliest date and time. Other examples of criteria and/or associated message information that might be considered in various applications might be the amount of payment offered in exchange for the media files, the number of media files requested, the identification of one or more requesting entities as preferred recipients, and/or the like.

When the appropriate media file recipients have been designated, the one or more requested media files are packaged at 730 in preparation for transmission to those recipients. The versions packaged here for transmission may be full-resolution versions that are free of obscuring watermarks. In one implementation, the Transmitter may be configured to automatically transmit the media file package to the designated recipients without further Transmitter user intervention 735. In an alternative implementation, the Transmitter may be configured to prompt the user with a notification that the media file package has been prepared and is ready for transmission to the designated recipient 740. The prompt may also include a one-click transmission feature, allowing the user to easily elect to transmit the media file package. In still another implementation, the Transmitter will not prepare the transmission package until after prompting the user of the intended transmission and receiving an affirmative response.

These variations allow for contractual obligations to become part of the data exchange. For example, when a user sends out low resolution images to a set of recipients, the transmission may include unique document identifiers and links for each of the low resolution image. This transmission may include contractual language that makes it clear that once a user selects a link they are contractually bound to purchase the full resolution version of the selected image; the user may specify a purchase price for the full resolution image and terms of use in this contractual section. In one embodiment, such contractual information may be implemented as a signature boilerplate where the user may change terms. In one embodiment, when a recipient of the reduced resolution images desires one of the full resolution images, they may click on a supplied link in the email. In one embodiment, the supplied link may be a "mailto:" link that pre-populates a responding email back to the original sender with the unique identifier of the selected image in the subject line. In a first-come-first served model, the first recipient to respond by selecting a given link for an image, that recipient would then be awarded the full version of the image. In one embodiment, when the Transmitter receives such an email from a recipient, it parses the recipient's return email requesting the full resolution version, and uses the unique identifier to find the full resolution image, mark that image as "sold" and automatically sends out the full resolution image only to the first buyer. In an alternative embodiment, an auction model may be employed where the Transmitter will wait a specified amount of time and discern which of the respondents bid the highest amount for any of its images and send out the full resolution image to the winning bidder. In one embodiment, auction outlet sites such as scoopt.com may be engaged to carry out the auction. In another embodiment, the Transmitter may automatically create an Ebay auction. In the Ebay model, the user supplies the Transmitter with his or her Ebay login name and password, and the Transmitter connects to Ebay to create an auction based on the reduced quality images, and sends the link to the Ebay auction to the list of lower resolution image recipients. This Ebay model has the advantage of greatly reducing transmissions as the reduced resolutions are available at the Ebay auction and require no further re-transmissions from the Transmitter.

Figure 8:
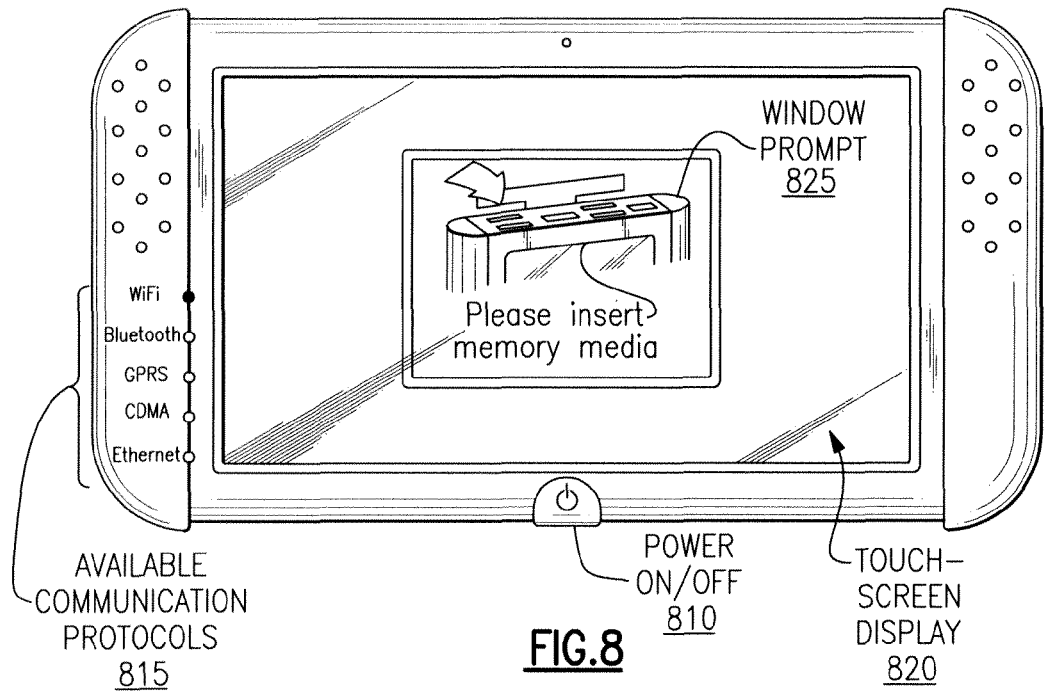
FIG. 8 illustrates an implementation of a user interface in one embodiment of Transmitter operation.

FIG. 8 illustrates an implementation of a user interface in one embodiment of Transmitter operation. The user interface in this embodiment is configured as a touch-screen display 820 that may be powered on and off by a power button 810. In this embodiment, a collection of LED indicators 815 show the available communication protocols to the Transmitter, e.g., WiFi, Bluetooth, GPRS, CDMA and Ethernet. In this implementation, the WiFi LED indicator is on showing that the Transmitter is in the communication range of a WiFi network. In other Transmitter implementations, the availability and connectivity for the different communication protocols may also be displayed on the touch-screen display 820 and the user of the Transmitter may be allowed to select which communication protocol to use. For example, when both Ethernet and WiFi communication protocols are available, a user may select to use Ethernet because of security considerations. In a further implementation, the protocol to be used may be automatically selected by the Transmitter based on an analysis of protocol performance and/or integrity. In another embodiment, the cheapest communication protocol may be selected automatically by the Transmitter. In one implementation, when the Transmitter is turned on using the power button 810, a window 825 may pop-up prompting the user to insert memory media. As discussed above, in one embodiment of Transmitter operation, memory media may include but not be limited to Compact Flash memory cards, Secure Digital (SD) Flash memory cards, extreme digital (XD) picture cards, mini SD and memory sticks.

Figure 9:
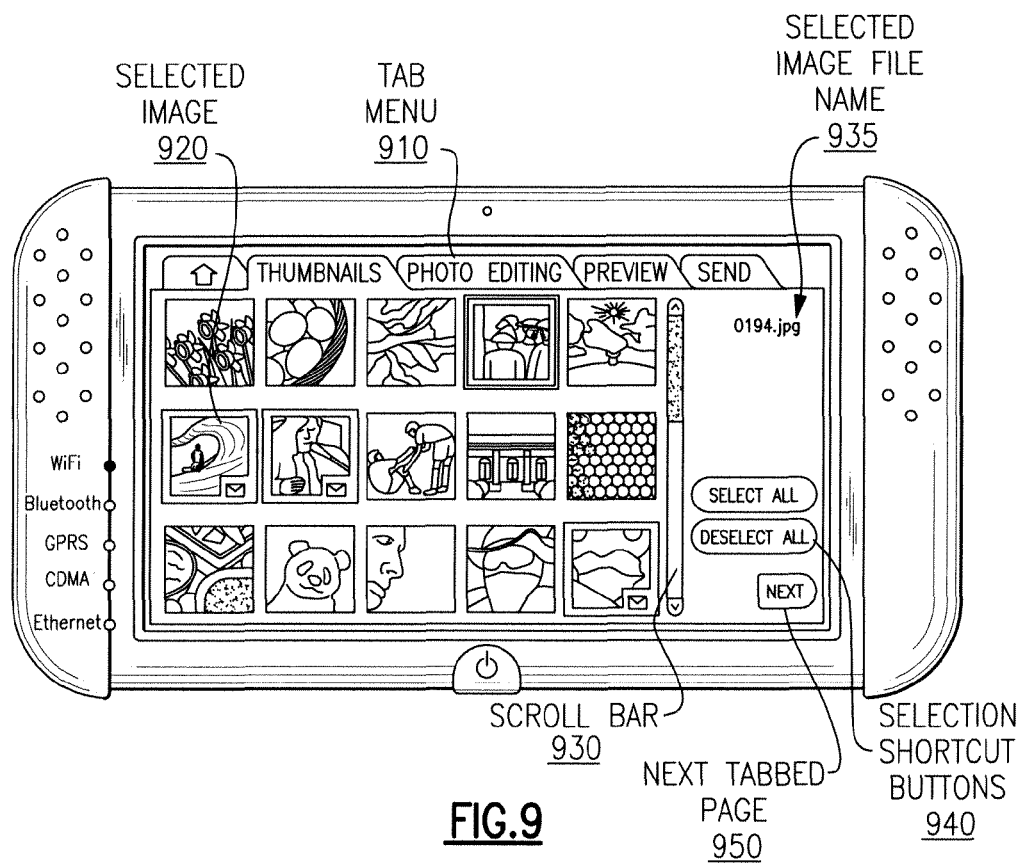
FIG. 9 illustrates an implementation of a user interface for selecting images for editing in one embodiment of Transmitter operation.

FIG. 9 illustrates an implementation of a user interface for selecting images for editing in one embodiment of Transmitter operation. In this implementation, when a user inserts acceptable memory media into the Transmitter, a tab menu 910 may appear to enable the user to select, edit, preview and send images that are stored in the inserted memory media. In one implementation, the available tab pages of the Tab Menu 910 may be Thumbnails, Photo Editing, Preview and Send. FIG. 9 illustrates the user interface for one implementation of the Thumbnails page of the Tab Menu 910. In this implementation, the thumbnails for the available images on the inserted media may be displayed in a matrix configuration and a scroll bar 930 may allow a user to view more thumbnails. Users may be able to use the touch-screen display to select images for photo editing and sending. When a thumbnail 920 is selected, a bold border may appear around the selected thumbnail, a mail icon tag may appear at the corner of the selected thumbnail and the image file name may be shown 935 on the display. In one embodiment, the Transmitter may allow the user to rename the file. In one implementation, selection shortcut buttons 940 may allow a user to select or deselect all available thumbnails. In further implementations, a user may be able to zoom in an image by double-clicking on a thumbnail and study the image details in order to determine whether to select it or not. Once the image selection is completed, a user may hit the "Next" button 950 in order to proceed with the necessary photo editing.

Figure 10:
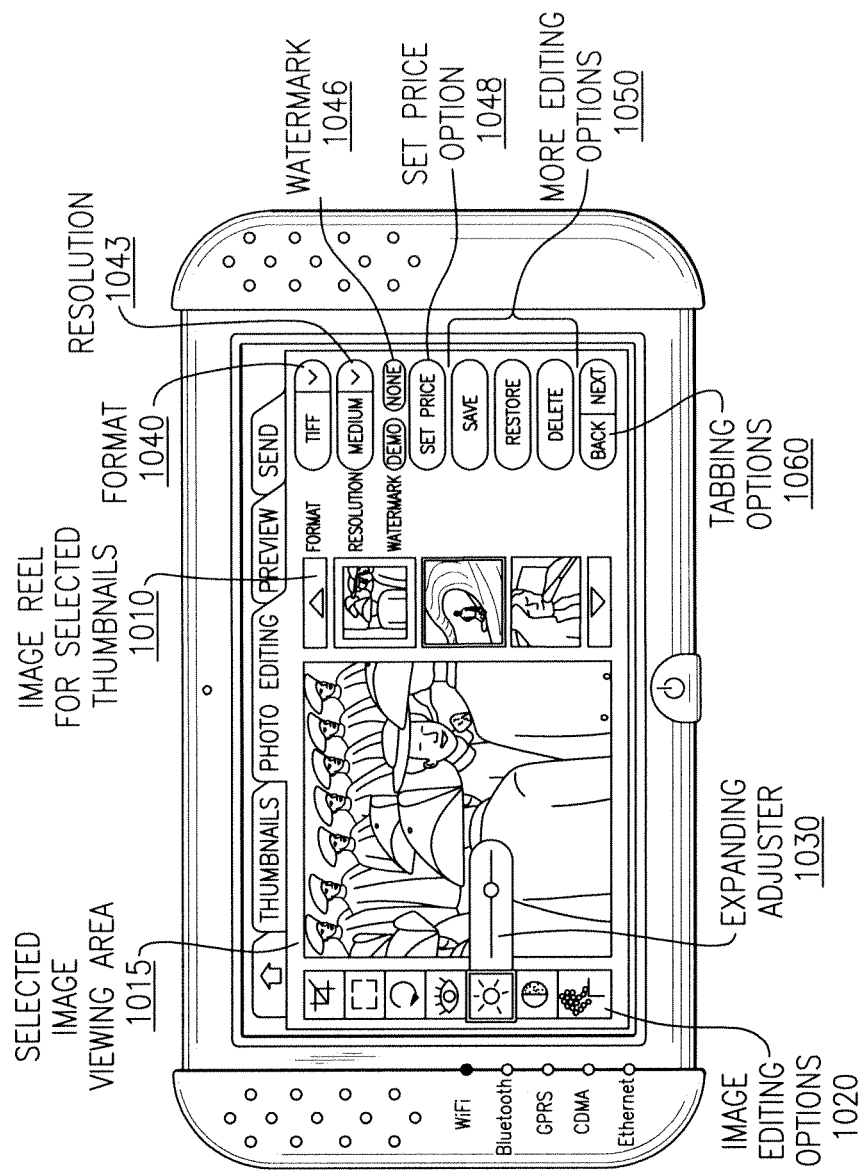
FIG. 10 illustrates an implementation of a user interface for image editing in one embodiment of Transmitter operation.

FIG. 10 illustrates an implementation of a user interface for image editing (the Photo Editing tab) in one embodiment of Transmitter operation. In this implementation, the Photo Editing tab may contain the collection of user selected thumbnails stored in an image reel 1010 for quick and convenient retrieval. When a user selects or highlights a thumbnail from the collection of available thumbnails stored in the image reel 1010, the full size of selected image may be displayed in an image viewing area 1015 and enable the user to utilize various editing tools that may be accessible through an Image Editing Options Menu 1020 to the left of the viewing area. In one implementation, the Image Editing Options Menu 1020 may include a listing of icons representative of various image editing tools, including but not limited to a crop tool, selection/resizing tool, rotation tool, red-eye reduction tool, brightness adjustment tool, hue adjustment tool, sharpness adjustment tool, and/or the like. When a user selects an image editing tool, an expanding adjuster 1030 may pop-up that allows the user to adjust the level of variation of the selected image property. The user interface of the Photo Editing page of FIG. 10 may further contain a selection of pop-up menus whereby a user may select a desired file format 1040, resolution 1043, and/or watermark 1046 for the displayed file(s). In one Transmitter implementation, the file format option 1040 may admit selections such as but not limited to JPEG, TIFF, BMP, raw image/video/audio, GIF, TGA, PCX, AVI, WMV, RealVideo, RealAudio, MPEG1-4, ISO image, ZIP, RAR, and/or the like. The resolution option 1043 may admit selections such as high, medium, low, maximum, preview, and/or the like. In alternative implementations, the resolution may admit a continuous variation, as may be designated using a slider widget or similar interface component. The watermark option 1040 may admit selections corresponding to no watermark and/or any of a selection of watermarks created, uploaded, and/or watermarks stored by a user. In one embodiment, a "new" option may be available to the user for the user to create new watermarks on demand. In one implementation, the new watermarks may include but not be limited to the user's name, the user's company name, the desired sell price for the image, and/or the like. In one implementation, when the user clicks on the "Set price" button 1048, a pop-up window may appear that allows the user to set the desired sell price for the selected image. The display area in FIG. 10 may further include editing buttons 1050 to save, restore, and/or delete the displayed image file in the viewing area. Tabbing options buttons 1060 may also allow a user to move to the next tabbed page to preview the edited images or to the previous tabbed page to change the image selection.

Figure 11:
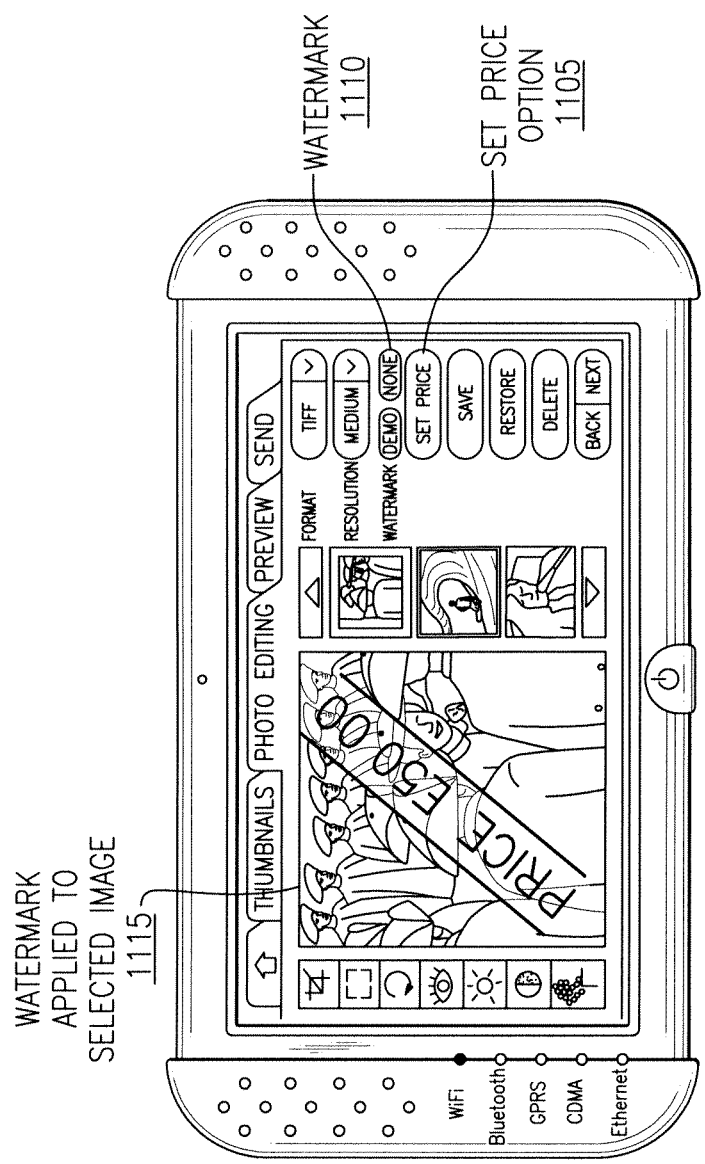
FIG. 11 illustrates an implementation of a user interface for applying watermarks to images in one embodiment of Transmitter operation.

FIG. 11 illustrates an implementation of a user interface for applying watermarks to images in one embodiment of Transmitter operation. In this implementation, a user may turn a watermark application on by pressing the watermark button 1110. If a user does not select the type of watermark to be applied, the default watermark is applied to the selected image. As discussed above, in further implementations a user may create new watermarks that may include but not be limited to the user's name, the user's company name, the user's contact information, the minimum-acceptable sell price for the image, and/or the like. In the example shown in FIG. 11, the watermark applied to the selected image 1115 is the minimum-acceptable sell price for the image, e.g., "PRICE £50.00". At any time, editing options of the Photo Editing tab may allow a user to save, restore or delete the displayed image.

Figure 12:
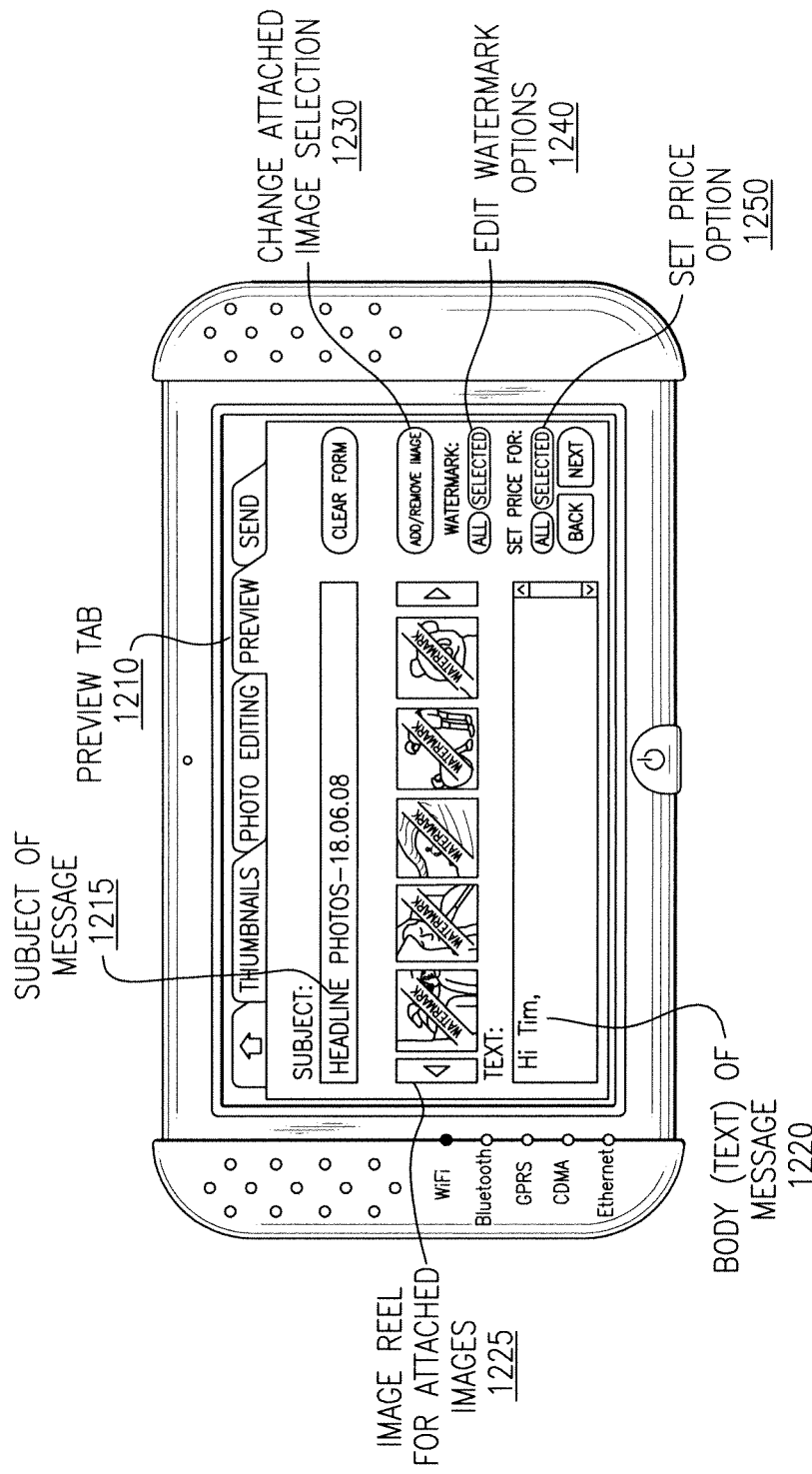
FIGS. 12-14 illustrate an implementation of a user interface for selecting and previewing images for transmission in one embodiment of Transmitter operation.
Figure 13:
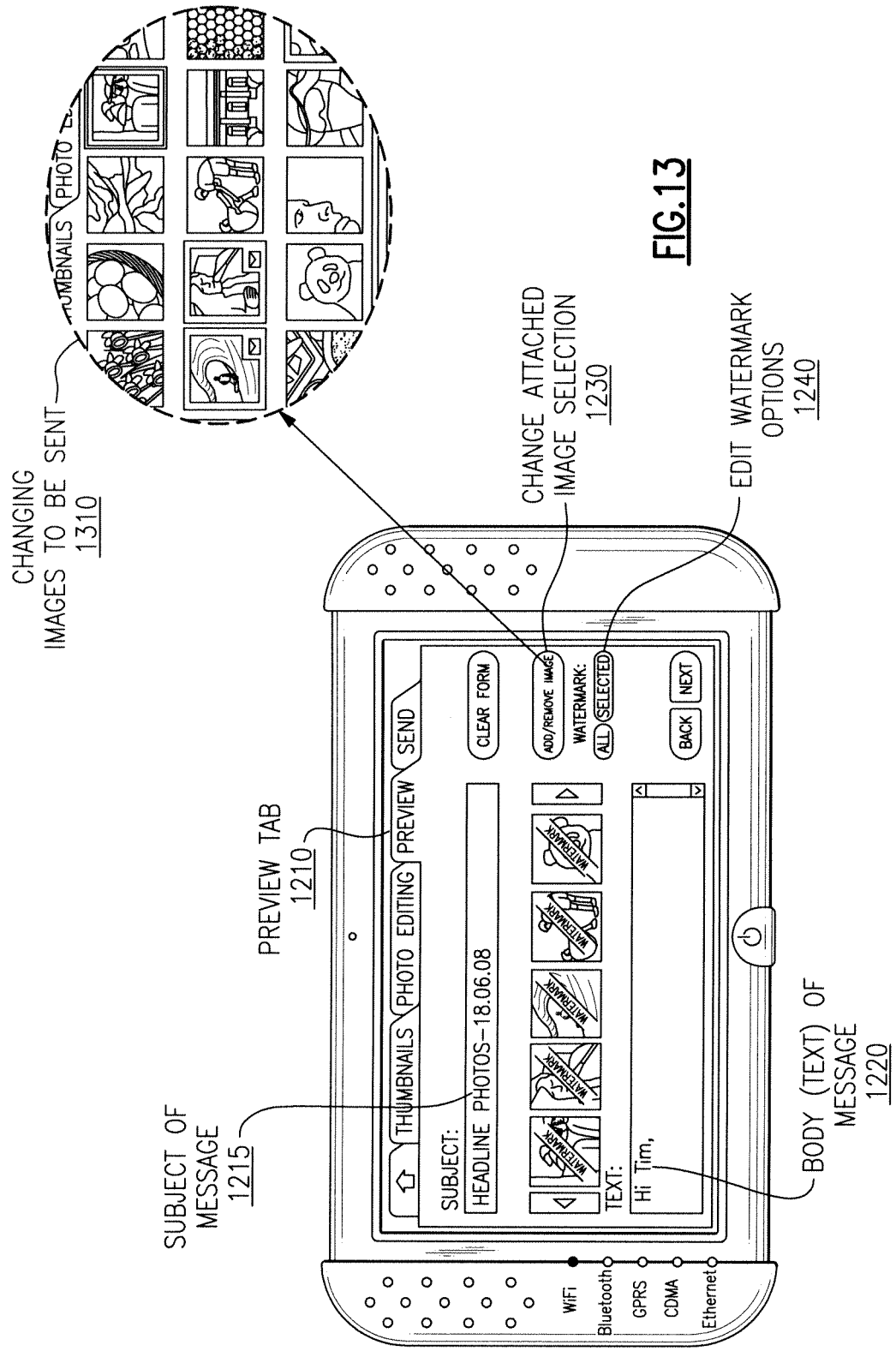
Figure 14:
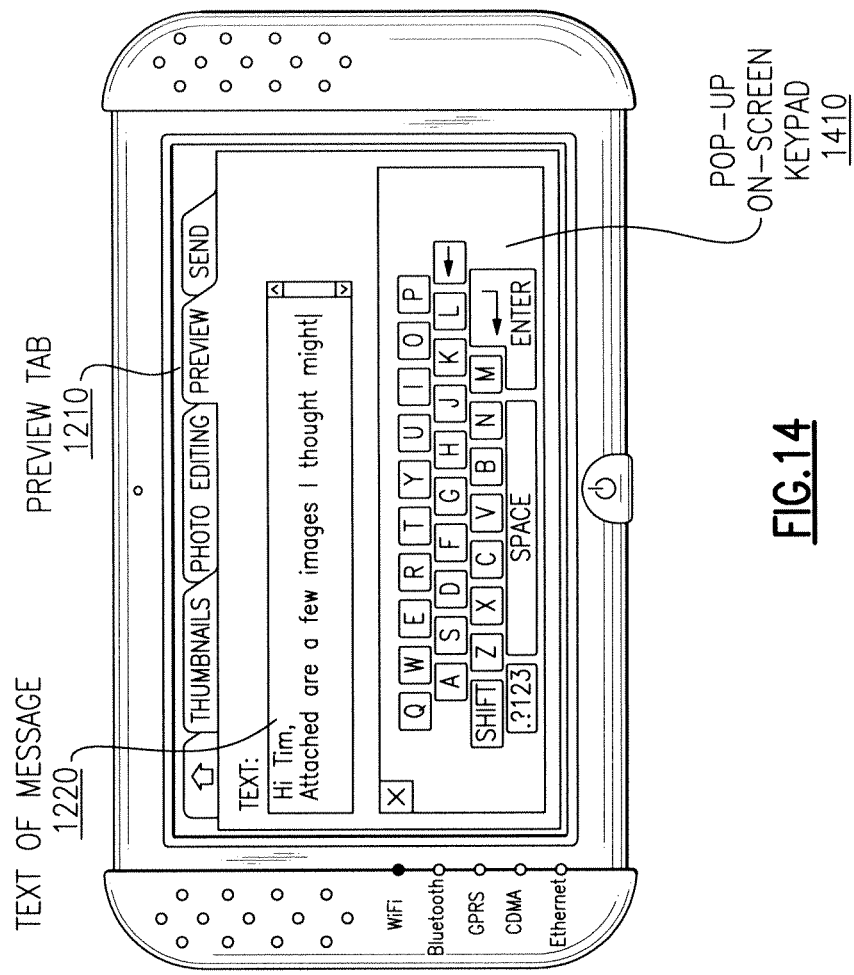
Figure 15A:
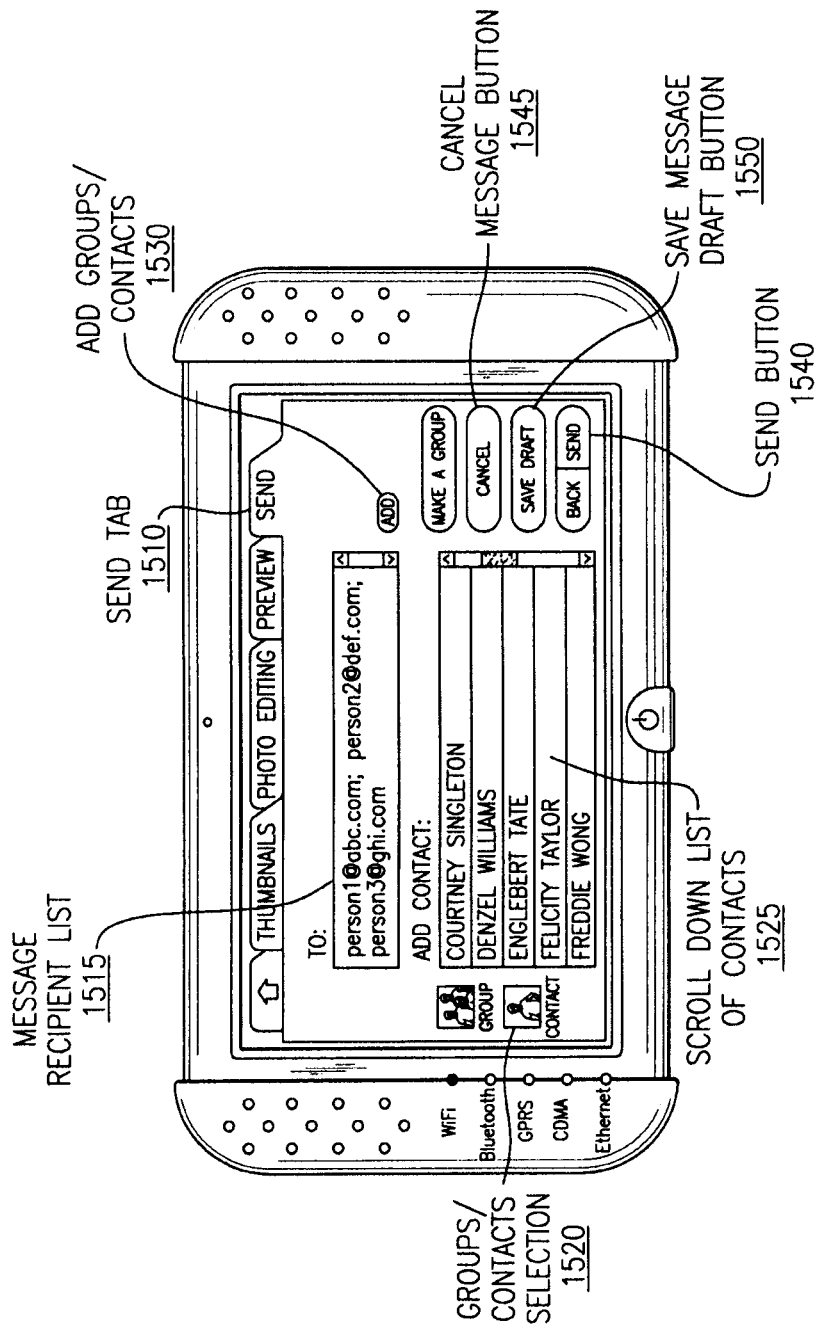
FIGS. 15A-15C illustrate an implementation of a user interface for sending messages in one embodiment of Transmitter operation.
Figure 15B:
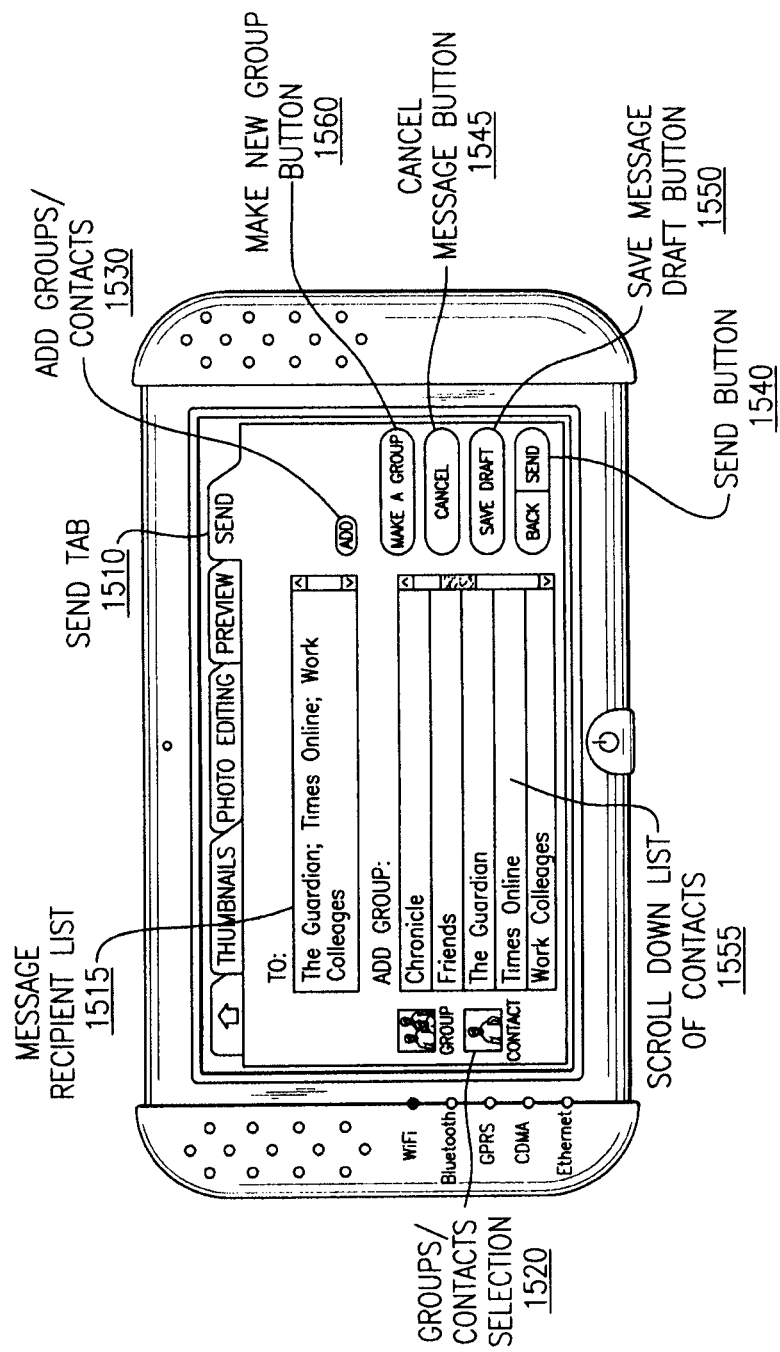
Figure 15C:
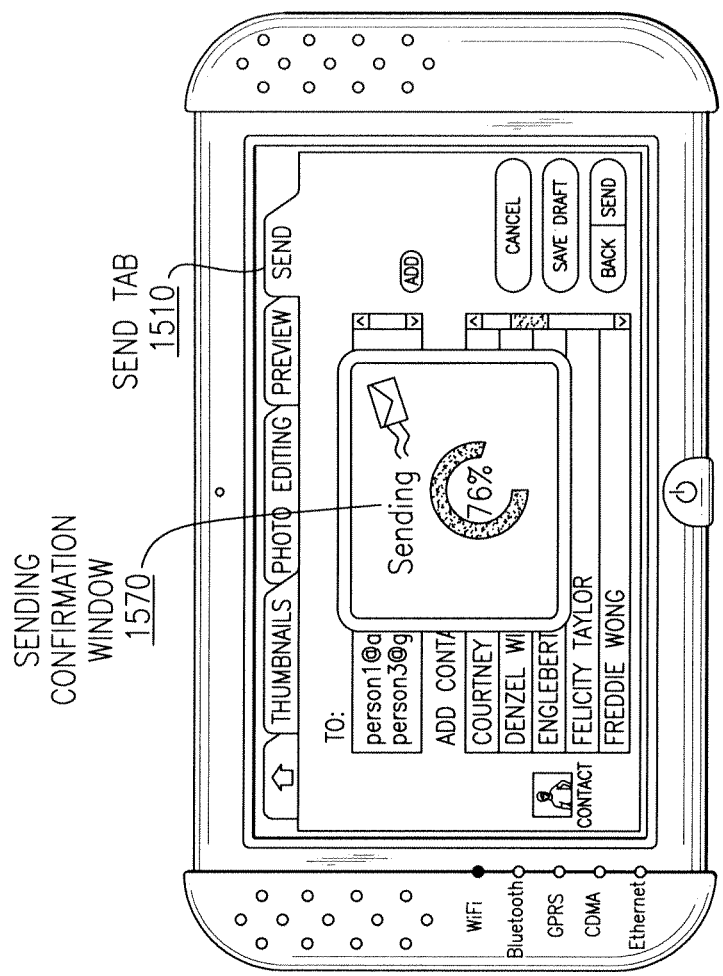

FIGS. 12-14 illustrate an implementation of a user interface for selecting and previewing images for transmission in one embodiment of Transmitter operation. In this implementation, the Preview Tab 1210 may allow a user to preview the selected and possibly edited image(s) and compose a message to be sent with the selected image(s) as attachment(s). The composed message may contain a subject 1215 and a body 1220. In one implementation, when a user taps or clicks on the area of the text message 1220 (or the subject 1215), an on-screen keypad 1410 may appear as that displayed in FIG. 14 that may allow the user to edit the contents of the message 1220 (or the subject of the message 1215). In further implementations, an external keyboard may be incorporated to facilitate the input of text. In one implementation, as that shown in FIG. 12, the preview tab 1210 may contain the collection of selected images stored in an image reel 1225 for quick and convenient retrieval and a watermark application 1240 may allow the user to apply a watermark to all the images to be sent. The preview tab 1210 may provide the user with buttons 1250 to set the price of a selected photo or set the price of all photos. In one implementation, the preview tab may also allow the user to have the set price(s) as part of a watermark applied to the image(s). In the implementation of FIG. 12, a user may also select to add or remove images to the collection of attached images by pressing the "Add/Remove Image" button 1230. As shown in FIG. 13, in one implementation, when the user wants to add or remove images to the attached image selection, the user may be taken back to the Thumbnails tab 1310 in order to make the necessary changes to the image selection. The thumbnails previously selected for editing may be automatically selected to be sent and a mail icon tag may appear at the corner of each of the previously selected images. A user may change his image selection according to the procedures described above and then proceed to the Photo Editing tab to make the necessary image editing. Once the image selection is finalized and the accompanying message is composed, a user may click on the "Next" button in order to go to the next tabbed page which is the "Send" tab. FIGS. 15A-15C illustrate an implementation of a user interface for sending messages in one embodiment of Transmitter operation. In this implementation, the Send tab 1510 of FIG. 15A may allow a user to send the message to an email message recipient list 1515. In other implementations, the Transmitter may be configured to send MMS messages, skype messages, AIM messages, and/or the like. In this implementation, a user may choose the message recipient list 1515 by first displaying either Groups of contacts or Contacts 1520. In the example of FIG. 15A, the Contact tab 1520 is selected and a scroll down list of contacts 1525 appears that enables the user to select the contacts to send the message to. In one implementation, when a contact is selected from the scroll down list the email information of the contact immediately appears on the comprehensive message recipient list 1515. In other implementations, the user may select the "Add" button 1530 in order to create new contacts or groups of contacts, or to type in the contact information of people without adding them to the contact list(s). In the example of FIG. 15B, the Group tab 1520 is selected and a scroll down list of groups 1555 appears that enables the user to select the groups to send the message to. The list of groups 1555 may contain default groups for major media publications such as "The Guardian" or "Times Online" as well as user-created groups such as "Friends" and "Work Colleagues". In one implementation, the Transmitter may also allow a user to create new groups by pressing the appropriate "Make a Group" button 1560. The Transmitter may also allow the user to cancel the message 1545, save a draft of the message 1550, or send the message 1540. When the user selects the "Send" button 1540, a sending confirmation window 1570, such as that displayed in FIG. 15C, appears that indicates the message sending progress. In one implementation, components provided by open-source email programs such as Sylpheed, Balsa, and/or the like, may be accessed through their respective APIs. In other implementations, a highly customized email client based on the Linux operating system may also be used by the Transmitter.

Figure 16A:
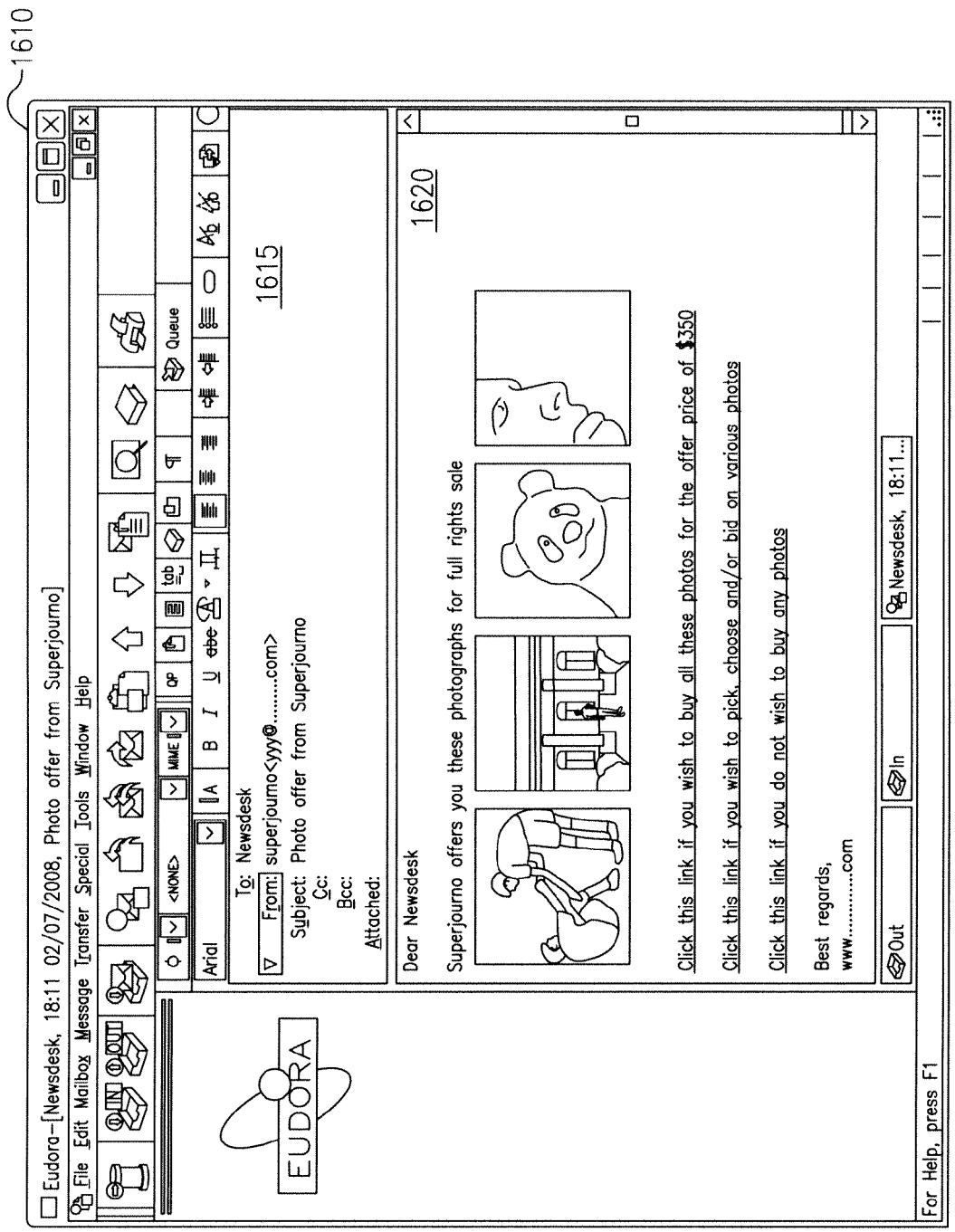
FIGS. 16A-16C are screen image diagrams illustrating aspects of receiving Transmitter originated email messages and buying or bidding for the selected images.
Figure 16B:
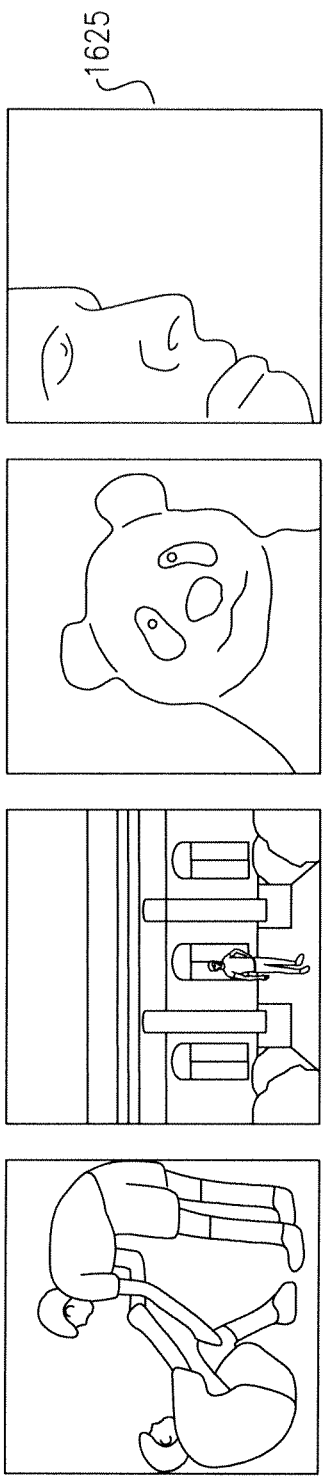
Figure 16C:
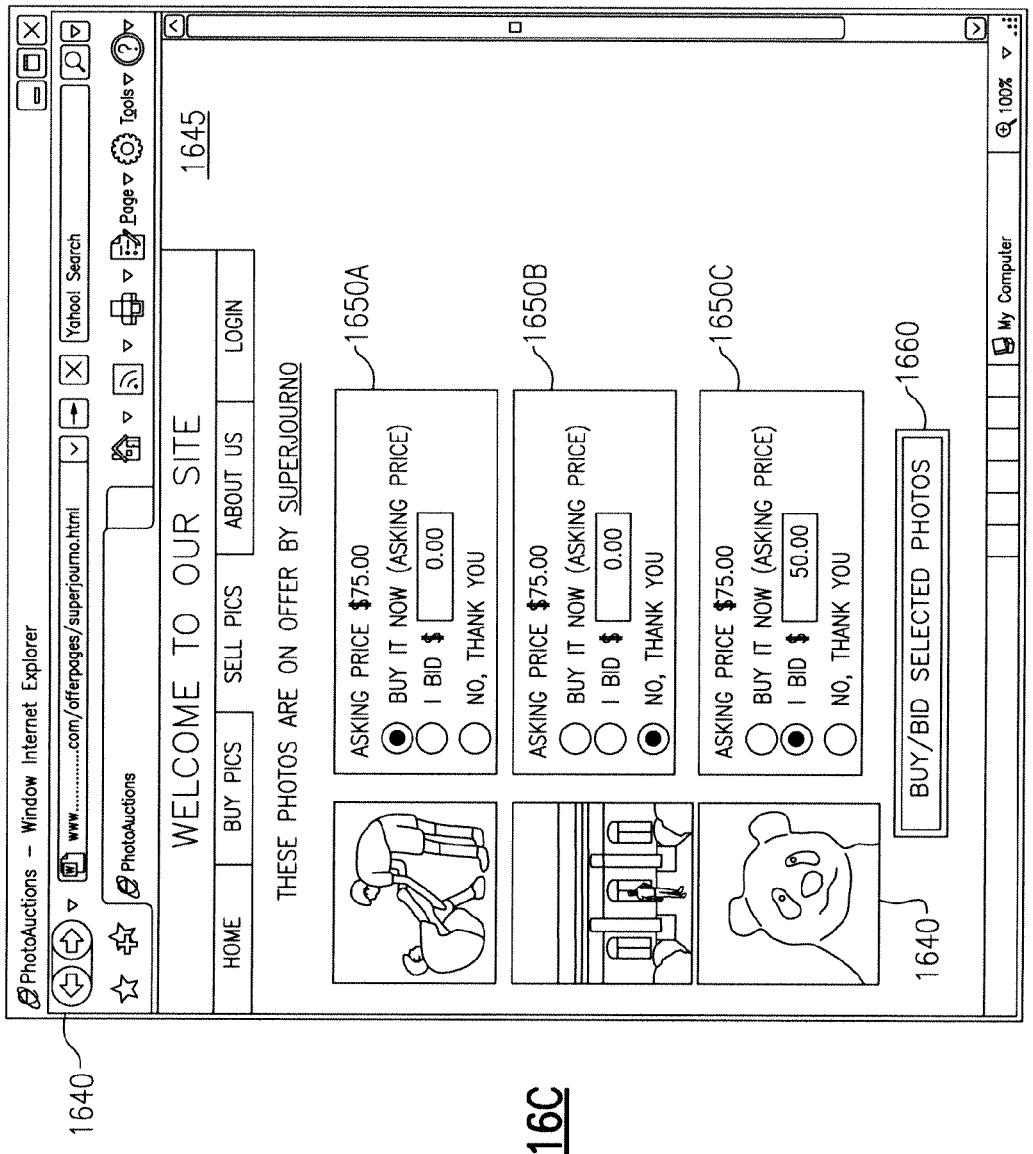

In one embodiment, FIGS. 16A-16C are screen image diagrams illustrating aspects of receiving Transmitter originated email messages that include a selection of low-resolution images (thumbnails) and buying or bidding for the selected images. In one implementation, FIG. 16A is of a screen image diagram of an email message received by "Newsdesk" and originated by a Transmitter user with email address "yyy@........com". The email message 1620 may display a selection of thumbnail images and allow the recipient to preview the images and decide whether to buy or bid on any of them. FIG. 16B provides a blown-up view of the email message 1620 received by Newsdesk. In one implementation, the email message offering the images for full rights sale may display the image thumbnails 1625 in the body of the email and prompt the recipient to click on various links for performing different actions. For example, one link 1630 may allow the recipient to buy all the displayed photos for a fixed offer price, another link 1633 may allow the recipient to choose which photos to buy or bid on, and a third link 1636 may allow the recipient to indicate that he has no intention to buy any of the photos. In one implementation, when a recipient engages link 1633 a browser window 1640 such as that of FIG. 16C may open up that displays a website 1645 with more information about the photos. For example, the photos offered for sale by Superjourno may be displayed in a column 1640 and next to each photo a relevant tab (1650A-1650C) may appear allowing the recipient to indicate the action to take on each photo. In one implementation, the tab 1650A may be used to inform the recipient about the asking price for each photograph and provide information about options to buy each photo at the asking price, bid for each photo for another amount, or indicate that there is no interest for the photo. In one implementation, one of the selections of the tab 1650A may be selected by default. In the example of FIG. 16C, the recipient may choose to buy the first photograph at the asking price and bid $50.00 for the third photograph. When a recipient goes through the list of photos 1640 and indicates his selection for each photo on the appropriate tab 1650, the recipient may click on a button 1660 to buy or bid on the selected photos. If the bidding or purchase price results in a successful purchase by the recipient and the recipient payment method is verified, a confirmation email may be sent to the recipient with the details of the order and the purchased images attached as full-resolution images. In further embodiments, after an unsuccessful bidding attempt for a photo, a recipient may be instructed that their next bidding attempt for the same photo can only come after a specified amount of time. In further implementations, after an unsuccessful attempt a recipient may also be given one counter-offer with a new minimum amount necessary to purchase the photo.

Various Applications

The Transmitter provides an efficient and effective means to view, store, edit, and transmit digital media files that may be applied to a wide variety of media applications. In one embodiment, the Transmitter may be employed by photographers, photojournalists, and/or the like to rapidly process, edit, and send photographs or video to multiple news agencies, newspapers, magazines, television studios, websites, and/or the like while maintaining control over their photographs by allowing them to send reduced quality and watermarked proofs. The Transmitter's broad communication capabilities ensure that it is maximally effective in locating and exploiting available communication networks, even when a photographer is in a remote location. Transmitter features, particularly those permitting resolution adjustment and watermark application, allow users to send demo or preview-quality versions of media files for initial approval prior to sending higher quality originals.

In another embodiment, the Transmitter may be employed within the fashion or entertainment industries. For example, the Transmitter may allow fashion photographers to quickly apply basic edits to photographs before sending them to magazines, advertisers, and/or the like to receive feedback and/or instructions for additional photographs. Selected photographs may then be sent in high-quality format for publication. The Transmitter may be particularly useful in this context, as fashion photography may often take place in remote locations that lack coverage by one or more standard communication networks. In another example, the Transmitter allows filming location scouts to quickly send high-quality images of candidate locations to directors, producers, and/or the like, with little regard for the network coverage in those areas. The Transmitter may also allow for the processing and transmission of video and/or audio footage shot in such locations. In either of the above embodiments, an option may be included to send an invoice to a recipient of the final images, along with the images.

In another embodiment, the Transmitter may include and/or employ a parallel port, USB port, and/or the like to interface with various printers to produce printed photographs. The Transmitter may further include drives, ports, and/or the like to facilitate the production of CDs, DVDs, video cassettes, and/or the like. In another embodiment, the Transmitter may incorporate an integrated printer within the body of a Transmitter device. Such a printer may be capable of printing photographs, as well as address labels, envelopes, stamps and/or stamp-equivalent codes, bar codes, matrix codes, and/or the like.

In another embodiment, the Transmitter may be employed as a universal media file transmission device. Because the Transmitter is compatible with a wide variety of different communication networks, protocols, and formats, it is highly effective in coupling to a data transmission stream in conditions where single protocol devices and systems may be out of range of their unique host networks. The Transmitter is ideally suited for travel and/or tourism related activities in which a user may want to process, store, or transmit media while situated in unfamiliar or remote surroundings. In particular, the Transmitter facilitates mobile blogging applications.

In another embodiment, the Transmitter may be employed in the tourism industry. For example, Transmitter enabled devices may be employed in theme parks to allow users to plug in a memory card or other data interface (e.g., camera cable), apply basic edits to their photographs, and immediately send the photographs to their own e-mail addresses or those of their friends and/or family, to post the photographs on a website, and/or the like. Having stored the photographs remotely, the user is then free to erase files from the memory card in order to free up space for subsequent media acquisition. In some implementations, the Transmitter enabled devices may charge a fee for this service. In another example, a Transmitter enabled device may be employed as part of a safari tour. The device may be provided at a base station or even integrated into a safari vehicle to allow safari goers to store and transmit the numerous, high-quality photographs and video files they acquire.

In another embodiment, the Transmitter may be employed within a number of security, law enforcement, and/or military applications. The Transmitter's remote location flexibility and ability to process and transmit high quality media makes it ideally suited for surveillance and reconnaissance. Furthermore, the Transmitter's capabilities allow it to be used for processing, storing, and transmitting images of faces, fingerprints, retinas, ear shapes, and/or other uniquely identifying features that are of sufficient quality to permit detailed analysis and/or identification. In one implementation, Transmitter configured devices may be mounted in police cars, military vehicles, and/or the like. In another implementation, Transmitter configured devices may further include integrated finger print scanners and/or retinal scanners to enhance security.

Transmitter Controller

Figure 17:
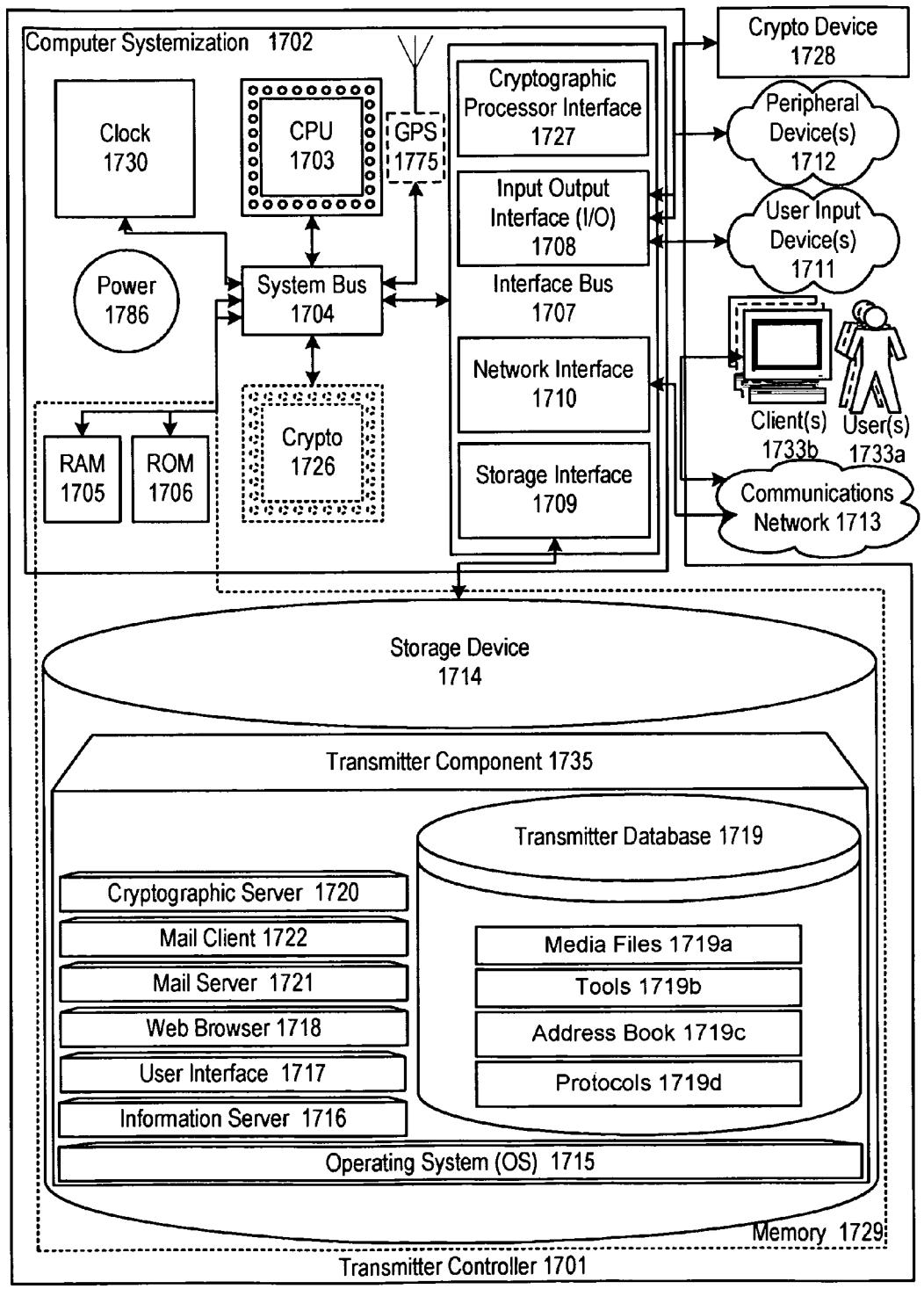
FIG. 17 is of a block diagram illustrating embodiments of the present invention of a Transmitter controller.

FIG. 17 of the present disclosure illustrates inventive aspects of a Transmitter controller 1701 in a block diagram. In this embodiment, the Transmitter controller 1701 may serve to aggregate, process, store, search, serve, identify, instruct, generate, match, and/or update databases, database elements, database element fields, and/or other related data.

Typically, users, which may be people and/or other systems, engage information technology systems (e.g., common computers) to facilitate information processing. In turn, computers employ processors to process information; such processors are often referred to as central processing units (CPU). A common form of processor is referred to as a microprocessor. CPUs use communicative signals to enable various operations. Such communicative signals may be stored and/or transmitted in batches as program and/or data components facilitate desired operations. These stored instruction code signals may engage the CPU circuit components to perform desired operations. A common type of program is a computer operating system, which, commonly, is executed by CPU on a computer; the operating system enables and facilitates users to access and operate computer information technology and resources. Common resources employed in information technology systems include: input and output mechanisms through which data may pass into and out of a computer; memory storage into which data may be saved; and processors by which information may be processed. Often information technology systems are used to collect data for later retrieval, analysis, and manipulation, commonly, which is facilitated through a database program. Information technology systems provide interfaces that allow users to access and operate various system components.

In one embodiment, the Transmitter controller 1701 may be connected to and/or communicate with entities such as, but not limited to: one or more users from user input devices 1711; peripheral devices 1712; a cryptographic processor device 1728; and/or a communications network 1713.

Networks are commonly thought to comprise the interconnection and interoperation of clients, servers, and intermediary nodes in a graph topology. It should be noted that the term "server" as used throughout this disclosure refers generally to a computer, other device, program, or combination thereof that processes and responds to the requests of remote users across a communications network. Servers serve their information to requesting "clients." The term "client" as used herein refers generally to a computer, other device, program, or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The Transmitter controller 1701 may be based on common computer systems that may comprise, but are not limited to, components such as: a computer systemization 1702 connected to memory 1729.

Computer Systemization

A computer systemization 1702 may comprise a clock 1730, central processing unit (CPU) 1703, a read only memory (ROM) 1706, a random access memory (RAM) 1705, and/or an interface bus 1707, and most frequently, although not necessarily, are all interconnected and/or communicating through a system bus 1704. Optionally, the computer systemization may be connected to an internal power source 1786. Optionally, a cryptographic processor 1726 may be connected to the system bus. The system clock typically has a crystal oscillator and provides a base signal. The clock is typically coupled to the system bus and various clock multipliers that will increase or decrease the base operating frequency for other components interconnected in the computer systemization. The clock and various components in a computer systemization drive signals embodying information throughout the system. Such transmission and reception of signals embodying information throughout a computer systemization may be commonly referred to as communications. These communicative signals may further be transmitted, received, and the cause of return and/or reply signal communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s). The CPU interacts with memory through signal passing through conductive conduits to execute stored signal program code according to conventional data processing techniques. Such signal passing facilitates communication within the Transmitter controller and beyond through various interfaces. Should processing requirements dictate a greater amount speed, parallel, mainframe and/or super-computer architectures may similarly be employed. Alternatively, should deployment requirements dictate greater portability, smaller Personal Digital Assistants (PDAs) may be employed.

Power Source

The power source 1786 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1786 is connected to at least one of the interconnected subsequent components of the Transmitter thereby providing an electric current to all subsequent components. In one example, the power source 1786 is connected to the system bus component 1704. In an alternative embodiment, an outside power source 1786 is provided through a connection across the I/O 1708 interface. For example, a USB and/or IEEE 1394 connection carries both data and power across the connection and is therefore a suitable source of power.

Interface Adapters

Interface bus(es) 1707 may accept, connect, and/or communicate to a number of interface adapters, conventionally although not necessarily in the form of adapter cards, such as but not limited to: input output interfaces (I/O) 1708, storage interfaces 1709, network interfaces 1710, and/or the like. Optionally, cryptographic processor interfaces 1727 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1709 may accept, communicate, and/or connect to a number of storage devices such as, but not limited to: storage devices 1714, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Transmitters (IEEE) 1394, fiber channel, Small Computer Systems Interface (SCSI), Universal Serial Bus (USB), and/or the like.

Network interfaces 1710 may accept, communicate, and/or connect to a communications network 1713. Through a communications network 1713, the Transmitter controller is accessible through remote clients 1733*b* (e.g., computers with web browsers) by users 1733*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 1710 may be used to engage with various communications network types 1713. For example, multiple network interfaces may be employed to allow for the communication over broadcast, multicast, and/or unicast networks.

Input Output interfaces (I/O) 1708 may accept, communicate, and/or connect to user input devices 1711, peripheral devices 1712, cryptographic processor devices 1728, and/or the like. I/O may employ connection protocols such as, but not limited to: Apple Desktop Bus (ADB); Apple Desktop Connector (ADC); audio: analog, digital, monaural, RCA, stereo, and/or the like; IEEE 1394a-b; infrared; joystick; keyboard; midi; optical; PC AT; PS/2; parallel; radio; serial; USB; video interface: BNC, coaxial, composite, digital, Digital Visual Interface (DVI), RCA, RF antennae, S-Video, VGA, and/or the like; wireless; and/or the like. A common output device is a television set, which accepts signals from a video interface. Also, a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composite information in a video memory frame. Typically, the video interface provides the composite video information through a video connection interface that accepts a video display interface (e.g., an RCA composite video connector accepting an RCA composite video cable; a DVI connector accepting a DVI display cable, etc.).

User input devices 1711 may be card readers, dongles, finger print readers, gloves, graphics tablets, joysticks, keyboards, mouse (mice), remote controls, retina readers, trackballs, trackpads, and/or the like.

Peripheral devices 1712 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the Transmitter controller may be embodied as an embedded, dedicated, and/or monitor-less (i.e., headless) device, wherein access would be provided over a network interface connection.

Cryptographic units such as, but not limited to, microcontrollers, processors 1726, interfaces 1727, and/or devices 1728 may be attached, and/or communicate with the Transmitter controller. A MC68HC16 microcontroller, commonly manufactured by Motorola Inc., may be used for and/or within cryptographic units. Equivalent microcontrollers and/or processors may also be used. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Other commercially available specialized cryptographic processors include VLSI Technology's 33 MHz 6868 or Semaphore Communications' 40 MHz Roadrunner 184.

Memory

Generally, any mechanization and/or embodiment allowing a processor to affect the storage and/or retrieval of information is regarded as memory 1729. However, memory is a fungible technology and resource, thus, any number of memory embodiments may be employed in lieu of or in concert with one another. It is to be understood that the Transmitter controller and/or a computer systemization may employ various forms of memory 1729. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 1729 will include ROM 1706, RAM 1705, and a storage device 1714. A storage device 1714 may be any conventional computer system storage. Storage devices may include a drum; a (fixed and/or removable) magnetic disk drive; a magneto-optical drive; an optical drive (i.e., CD ROM/RAM/Recordable (R), ReWritable (RW), DVD R/RW, etc.); an array of devices (e.g., Redundant Array of Independent Disks (RAID)); and/or other devices of the like. Thus, a computer systemization generally requires and makes use of memory.

Component Collection

The memory 1729 may contain a collection of program and/or database components and/or data such as, but not limited to: operating system component(s) 1715 (operating system); information server component(s) 1716 (information server); user interface component(s) 1717 (user interface); Web browser component(s) 1718 (Web browser); database(s) 1719; mail server component(s) 1721; mail client component(s) 1722; cryptographic server component(s) 1720 (cryptographic server); the Transmitter component(s) 1735; and/or the like (i.e., collectively a component collection). These components may be stored and accessed from the storage devices and/or from storage devices accessible through an interface bus. Although non-conventional program components such as those in the component collection, typically, are stored in a local storage device 1714, they may also be loaded and/or stored in memory such as: peripheral devices, RAM, remote storage facilities through a communications network, ROM, various forms of memory, and/or the like.

Operating System

The operating system component 1715 is an executable program component facilitating the operation of the Transmitter controller. Typically, the operating system facilitates access of I/O, network interfaces, peripheral devices, storage devices, and/or the like. The operating system may be a highly fault tolerant, scalable, and secure system such as Apple Macintosh OS X (Server), AT&T Plan 9, Be OS, Linux, Unix, and/or the like operating systems. However, more limited and/or less secure operating systems also may be employed such as Apple Macintosh OS, Microsoft DOS, Microsoft Windows 2000/2003/3.1/95/98/CE/Millenium/NT/Vista/XP (Server), Palm OS, and/or the like. Mobile operating systems such as Linux Mobile, Symbian, Microsoft Windows Mobile, Android, and/or the like may also be employed. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the Transmitter controller to communicate with other entities through a communications network 1713. Various communication protocols may be used by the Transmitter controller as a subcarrier transport mechanism for interaction, such as, but not limited to: multicast, TCP/IP, UDP, unicast, and/or the like.

Information Server

An information server component 1716 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C#, Common Gateway Interface (CGI) scripts, Java, JavaScript, Practical Extraction Report Language (PERL), Python, WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the Transmitter controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the Transmitter database 1719, operating systems, other program components, user interfaces, Web browsers, and/or the like.

Access to the Transmitter database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the Transmitter. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the Transmitter as a query. Upon generating query results from the query, the results are passed over the bridge mechanism, and may be parsed for formatting and generation of new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, Microsoft's Windows XP, or Unix's X-Windows provide a baseline and means of accessing and displaying information graphically to users.

A user interface component 1717 is a stored program component that is executed by a CPU. The user interface may be a conventional graphic user interface as provided by, with, and/or atop operating systems and/or operating environments such as Apple Macintosh OS, e.g., Aqua, GNUSTEP, Microsoft Windows (NT/XP), Unix X Windows (KDE, Gnome, and/or the like), Linux (e.g., Qtopia from Trolltech, Pixil from Century Software, and/or the like), mythTV, and/or the like. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1718 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Some Web browsers allow for the execution of program components through facilities such as Java, JavaScript, ActiveX, and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the Transmitter enabled nodes. The combined application may be nugatory on systems employing standard Web browsers.

Mail Server

A mail server component 1721 is a stored program component that is executed by a CPU 1703. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), CGI scripts, Java, JavaScript, PERL, pipes, Python, WebObjects, and/or the like. The mail server may support communications protocols such as, but not limited to: Internet message access protocol (IMAP), Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the Transmitter.

Access to the Transmitter mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1722 is a stored program component that is executed by a CPU 1703. The mail client may be a conventional mail viewing application such as Apple Mail, Microsoft Entourage, Microsoft Outlook, Microsoft Outlook Express, Mozilla Thunderbird, and/or the like. Mail clients may support a number of transfer protocols, such as: IMAP, Microsoft Exchange, POP3, SMTP, and/or the like. Components provided by open source mobile email clients based on Linux such as Sylpheed, Balsa, and/or the like, may also be accessed through their respective APIs. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1720 is a stored program component that is executed by a CPU 1703, cryptographic processor 1726, cryptographic processor interface 1727, cryptographic processor device 1728, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the Transmitter may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for a digital audio file. A cryptographic component may communicate to and/or with other components in a component collection, including itself, and/or facilities of the like. The cryptographic component supports encryption schemes allowing for the secure transmission of information across a communications network to enable the Transmitter component to engage in secure transactions if so desired. The cryptographic component facilitates the secure accessing of resources on the Transmitter and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The Transmitter Database

The Transmitter database component 1719 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the Transmitter database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the Transmitter database is implemented as a data-structure, the use of the Transmitter database 1719 may be integrated into another component such as the Transmitter component 1735. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 1719 includes several tables 1719*a-d*. A Media Files table 1719*a* may include fields such as, but not limited to: file ID, file name, file type, file format, file size, resolution, color depth, creation date, editing history, file source, file creator and/or owner, and/or the like. A Tools table 1719*b* may include fields such as, but not limited to: tool ID, tool name, tool type, plug-in location, associated file formats, tool values, templates and/or macros, and/or the like. An Address Book table 1719*c* may include fields such as, but not limited to: entry ID, entry name, e-mail address, IP address, URL, telephone number, location, postal address, preferred protocol, transmission history, and/or the like. A Protocols table 1719*d* may include fields such as, but not limited to: protocol ID, protocol name, protocol format rules, preferred locations, and/or the like. These and/or other tables may support and/or track multiple entity accounts on the Transmitter Controller.

In one embodiment, the Transmitter database may interact with other database systems. For example, employing a distributed database system, queries and data access by Transmitter modules may treat the combination of the Transmitter database and another database as a single database entity.

In one embodiment, user programs may contain various user interface primitives, which may serve to update the Transmitter. Also, various accounts may require custom database tables depending upon the environments and the types of clients the Transmitter may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 1719*a-d*. The Transmitter may be configured to keep track of various settings, inputs, and parameters via database controllers.

The Transmitter database may communicate to and/or with other components in a component collection, including itself, and/or facilities of the like. Most frequently, the Transmitter database communicates with the Transmitter component, other program components, and/or the like. The database may contain, retain, and provide information regarding other nodes and data.

The Transmitter Component

The Transmitter component 1735 is a stored program component that is executed by a CPU. The Transmitter component affects accessing, obtaining and the provision of information, services, transactions, and/or the like across various communications networks. As such, the Transmitter component enables one to access, calculate, engage, exchange, generate, identify, instruct, match, process, search, serve, store, and/or facilitate transactions to enable acquisition, processing, storage, and transmission of digital media files by a Transmitter-enabled device. In one embodiment, the Transmitter component incorporates any and/or all combinations of the aspects of the Transmitter that were discussed in the previous figures and appendices.

The Transmitter component enabling access of information between nodes may be developed by employing standard development tools such as, but not limited to: (ANSI) (Objective-) C (++), Apache components, binary executables, database adapters, Java, JavaScript, mapping tools, procedural and object oriented development tools, PERL, Python, shell scripts, SQL commands, web application server extensions, WebObjects, and/or the like. In one embodiment, the Transmitter server employs a cryptographic server to encrypt and decrypt communications. The Transmitter component may communicate to and/or with other components in a component collection, including itself, and/or facilities of the like. Most frequently, the Transmitter component communicates with the Transmitter database, operating systems, other program components, and/or the like. The Transmitter may contain, communicate, generate, obtain, and/or provide program component, system, user, and/or data communications, requests, and/or responses.

Distributed Transmitter

The structure and/or operation of any of the Transmitter node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the Transmitter controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), process pipes, shared files, and/or the like. Messages sent between discrete component components for inter-application communication or within memory spaces of a singular component for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between components. Again, the configuration will depend upon the context of system deployment.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. A processor-implemented method for processing digital media, comprising:

receiving a digital media file from a digital media input interface array, the digital media input interface array including at least a memory access component;

providing the digital media file for display on a display screen via an integrated media editing and transmission interface;

receiving at least one digital media file editing instruction from the integrated media editing and transmission interface;

modifying the digital media file based on the at least one digital media file editing instruction;

receiving at least one destination designation from the integrated media editing and transmission interface;

receiving at least one digital media transmission format selection specific to the digital media file from a plurality of user-selectable digital media transmission format options simultaneously displayed at the integrated media editing and transmission interface, wherein each of the user-selectable digital media transmission format options is selectable by a user via the integrated media editing and transmission interface to engage a corresponding digital media transmission format, and wherein the digital media transmission format includes any of a cellular network format, a wireless transmission format, an Ethernet format, or a USB format;

converting the digital media file into a form consistent with the at least one digital media transmission format selection; and sending the digital media file to a destination specified by the at least one destination designation via a digital media output interface array, the digital media output interface array including output components providing transmission capabilities consistent with at least the cellular network format, and a wireless transmission format.

2. The method of claim 1, wherein the digital media file comprises a still image.

3. The method of claim 1, wherein the digital media file comprises a video.

4. The method of claim 3, wherein the digital media file further comprises an audio supplement.

5. The method of claim 4, wherein the digital media file editing instruction comprises an audio supplement adjustment.

6. The method of claim 5, wherein the audio supplement adjustment comprises a change of volume.

7. The method of claim 1, wherein the memory access component is a flash memory card slot.

8. The method of claim 1, wherein the digital media input interface array further comprises a USB port.

9. The method of claim 8, wherein the USB port is the same as at least one of the output components.

10. The method of claim 1, wherein the display screen admits touch-screen input.

11. The method of claim 1, wherein the at least one digital media file editing instruction comprises an image crop.

12. The method of claim 1, wherein the at least one digital media file editing instruction comprises an image resize.

13. The method of claim 1, wherein the at least one digital media file editing instruction comprises an image rotation.

14. The method of claim 1, wherein the at least one digital media file editing instruction comprises a brightness adjustment.

15. The method of claim 1, wherein the at least one digital media file editing instruction comprises a color adjustment.

16. The method of claim 15, wherein the color adjustment comprises a color saturation adjustment.

17. The method of claim 15, wherein the color adjustment comprises a hue adjustment.

18. The method of claim 1, wherein the at least one digital media file editing instruction comprises a sharpness adjustment.

19. The method of claim 1, wherein the at least one digital media file editing instruction comprises a contrast adjustment.

20. The method of claim 1, wherein the at least one digital media file editing instruction comprises a red-eye reduction.

21. The method of claim 1, wherein the at least one digital media file editing instruction comprises application of a special effect.

22. The method of claim 21, wherein the special effect comprises a digital airbrushing.

23. The method of claim 1, wherein the at least one digital media file editing instruction comprises a resolution adjustment.

24. The method of claim 23, wherein the resolution adjustment admits at least a high resolution and a low resolution setting.

25. The method of claim 1, wherein the at least one digital media file editing instruction comprises a preview-quality conversion.

26. The method of claim 25, further comprising:
receiving a digital media file request message from a media requesting entity, the request message comprising at least one selection of a preview-quality converted media file; and
preparing a transmission package comprising a digital media file corresponding to the at least one selection of a preview-quality converted media file.

27. The method of claim 25, further comprising:
receiving a plurality of digital media file request messages from a set of media requesting entities, each request message comprising request selection content and at least one selection of a preview-quality converted media file;
searching the plurality of digital media file request messages for the request selection content;
selecting a recipient subset of the media requesting entities based on the request selection content and a set of request selection criteria; and
preparing a transmission package comprising a digital media file corresponding to the at least one selection of a preview-quality converted media file.

28. The method of claim 27, further comprising:
sending the transmission package to the recipient subset.

29. The method of claim 27, further comprising:
prompting a user to transmit the transmission package to the recipient subset.

30. The method of claim 27, wherein the request selection content comprises a time and the request selection criteria comprises an earliness criteria.

31. The method of claim 27, wherein the request selection content comprises a purchase bid and the request selection criteria comprises a bid maximization criteria.

32. The method of claim 25, wherein the preview-quality conversion comprises a resolution reduction.

33. The method of claim 25, wherein the preview-quality conversion comprises a reduction in file size of the digital media file.

34. The method of claim 1, wherein the at least one digital media file editing instruction comprises a file format designation.

35. The method of claim 34, wherein the file format designation admits at least a raw format and a compressed format.

36. The method of claim 35, wherein the compressed format comprises a lossless compressed format.

37. The method of claim 35, wherein the compressed format comprises a lossy compressed format.

38. The method of claim 35, wherein the compressed format is a format selected from the group consisting of JPEG, TIFF, GIF, and BMP.

39. The method of claim 1, wherein the at least one digital media file editing instruction comprises selection and incorporation of a watermark.

40. The method of claim 39, wherein the watermark includes a price for the at least one digital media file.

41. The method of claim 40, wherein the price corresponds to a user minimum acceptable sell price for the at least one digital media file.

42. The method of claim 39, wherein the watermark includes a photographer identification.

43. The method of claim 39, wherein the watermark is steganographically encoded within the at least one digital media file.

44. The method of claim 1, further comprising:
storing the modified digital media file.

45. The method of claim 44, wherein the modified digital media file is stored in an internal memory.

46. The method of claim 45, wherein the internal memory comprises a magnetic memory.

47. The method of claim 45, wherein the internal memory comprises a flash memory.

48. The method of claim 44, wherein the modified digital media file is stored in a removable memory card.

49. The method of claim 48, wherein the removable memory card is inserted in the memory access component in the digital media input interface array.

50. The method of claim 1, further comprising:
providing a restore option, whereby the modified digital media file may be restored to its original state prior to modification.

51. The method of claim 1, wherein the destination designation comprises an email address.

52. The method of claim 1, wherein the destination designation comprises an IP address.

53. The method of claim 1, wherein the destination designation comprises a URL.

54. The method of claim 1, wherein the destination designation comprises a telephone number.

55. The method of claim 1, wherein the destination designation comprises an instant messaging identity.

56. The method of claim 1, wherein the destination designation specifies more than one recipient.

57. The method of claim 1, wherein the destination designation is selected from a digital address book.

58. The method of claim 57, wherein the digital address book comprises at least one group of contacts.

59. The method of claim 1, wherein the cellular network format comprises GSM.

60. The method of claim 1, wherein the cellular network format comprises GPRS.

61. The method of claim 1, wherein the cellular network format comprises WCDMA.

62. The method of claim 1, wherein the cellular network format comprises CDMA.

63. The method of claim 59, wherein the cellular network format includes CDMA.

64. The method of claim 62, wherein the cellular network format includes GSM.

65. The method of claim 1, wherein the cellular network format comprises CDMA2000.

66. The method of claim 1, wherein the cellular network format comprises HSDPA.

67. The method of claim 1, wherein the selecting at least one digital media transmission format is based on an automatic decision.

68. The method of claim 67, wherein the automatic decision is based on a transmission integrity analysis.

69. The method of claim 67, wherein the automatic decision is based on monitoring reported signal strength of base stations.

70. The method of claim 68, wherein the transmission integrity analysis comprises a reliability estimate for each digital media transmission format.

71. The method of claim 67, wherein the automatic decision is presented to a user for confirmation prior to selecting the at least one digital media transmission format.

72. The method of claim 1, wherein the selecting at least one digital media transmission format is based on a user decision.

73. A processor-implemented method for processing digital images, comprising:
receiving a digital image from a digital media input interface array, the digital media input interface array including at least a memory access component and a USB port;
providing the digital image for display on a display screen via an integrated image editing and transmission interface, the display screen being configured to admit touch screen input;
providing a plurality of digital image editing options via the integrated image editing and transmission interface, including at least cropping, resizing, rotating, brightness, color adjustment, sharpness, contrast, resolution, file format, watermark, and red-eye reduction options;
receiving at least one digital image editing instruction selected from the plurality of digital image editing options via the integrated image editing and transmission interface;
modifying the digital image based on the at least one digital image editing instruction;
receiving at least one destination designation via the integrated image editing and transmission interface, wherein the destination designation is selected from a digital address book;
receiving at least one user-selected digital media transmission format selection specific to the digital media file from a plurality of user-selectable digital media transmission format options simultaneously displayed at the integrated image editing and transmission interface, wherein each of the plurality of user-selectable digital media transmission format options is selectable by a user via the integrated media editing and transmission interface to engage a corresponding digital media transmission format, and wherein the at least one digital media transmission format includes any of a GSM format, a GPRS format, a W-CDMA format, a CDMA format, a CDMA2000 format, a HSDPA format, a WiFi format, a Bluetooth format, an Ethernet format, or a USB format;
converting the digital media file into a form consistent with the at least one user-selected digital media transmission format selection; and
sending the configured digital media file to a destination specified by the at least one destination designation via a digital media output interface array, the digital media output interface array including output components providing transmission capabilities consistent with at least the GSM format, the GPRS format, the W-CDMA format, the CDMA format, the CDMA2000 format, the HSDPA format, the WiFi format, the Bluetooth format, the Ethernet format, and the USB format.

74. A processor-implemented method for processing digital media, comprising:
receiving a digital media file from a digital media input interface array, the digital media input interface array including at least a memory access component;
providing the digital media file for display on a display screen; receiving at least one digital media file editing instruction;
modifying the digital media file based on the at least one digital media file editing instruction;
receiving at least one destination designation;
receiving at least one user-selected digital media transmission format selection specific to the digital media file from a plurality of user-selectable digital media transmission format options simultaneously displayed at the integrated image editing and transmission interface, wherein each of the plurality of user-selectable digital media transmission format options is selectable by a user via the integrated media editing and transmission interface to engage a corresponding digital media transmission format, and wherein the at least one user-selected digital media transmission format includes any of a cellular network format, a wireless transmission format, an Ethernet format, or a USB format;

converting the digital media file into a form consistent with the at least one user-selected digital media file transmission format selection; and sending the digital media file to a destination specified by the at least one destination designation via a digital media output interface array, the digital media output interface array including output components providing transmission capabilities consistent with at least the cellular network format, and the wireless transmission format.

75. An apparatus to process digital media, comprising:

a memory;

a processor disposed in communication with said memory, and configured to issue a plurality of instructions stored in the memory, wherein the instructions issue signals to:

receive a digital media file from a digital media input interface array, the digital media input interface array including at least a memory access component;

provide the digital media file for display on a display screen via an integrated media editing and transmission interface;

receive at least one digital media file editing instruction from the integrated media editing and transmission interface;

modify the digital media file based on the at least one digital media file editing instruction;

receive at least one destination designation from the integrated media editing and transmission interface;

receive at least one user-selected digital media transmission format selection specific to the digital media file from a plurality of user-selectable digital media transmission format options simultaneously displayed at the integrated media editing and transmission interface, wherein each of the plurality of user-selectable digital media transmission format options is selectable by a user via the integrated media editing and transmission interface to engage a corresponding digital media transmission format, and wherein the digital media transmission format selection includes any of a cellular network format, a wireless transmission format, an Ethernet format, or a USB format;

convert the digital media file into a form consistent with the at least one user-selected digital media transmission format selection; and send the digital media file to a destination specified by the at least one destination designation via a digital media output interface array, the digital media output interface array including output components providing transmission capabilities consistent with at least the cellular network format, and the wireless transmission format.

76. A non-transitory, computer-readable medium comprising a plurality of processing instructions issuable by the processor to:

receive a digital media file from a digital media input interface array, the digital media input interface array including at least a memory access component;

provide the digital media file for display on a display screen via an integrated media editing and transmission interface;

receive at least one digital media file editing instruction from the integrated media editing and transmission interface;

modify the digital media file based on the at least one digital media file editing instruction;

receive at least one destination designation from the integrated media editing and transmission interface;

receive at least one user-selected digital media transmission format selection specific to the digital media file from a plurality of user-selectable digital media transmission format options simultaneously displayed at the integrated media editing and transmission interface, wherein each of the plurality of user-selectable digital media transmission format options is selectable by a user via the integrated media editing and transmission interface to engage a corresponding digital media transmission format, and wherein the digital media transmission format selection includes any of a cellular network format, a wireless transmission format, an Ethernet format, or a USB format;

convert the digital media file into a form consistent with the at least one data user-selected digital media transmission format selection; and send the digital media file to a destination specified by the at least one destination designation via a digital media output interface array, the digital media output interface array including output components providing transmission capabilities consistent with at least the cellular network format, and the wireless transmission format.

* * * * *